(12) United States Patent
Ström

(10) Patent No.: US 9,087,365 B2
(45) Date of Patent: *Jul. 21, 2015

(54) WEIGHT BASED IMAGE PROCESSING

(71) Applicant: TELEFONAKTIEBOLAGET L M ERICSSON (PUBL), Stockholm (SE)

(72) Inventor: Jacob Ström, Stockholm (SE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 41 days.

This patent is subject to a terminal disclaimer.

(21) Appl. No.: 13/826,578

(22) Filed: Mar. 14, 2013

(65) Prior Publication Data

US 2013/0287295 A1    Oct. 31, 2013

Related U.S. Application Data

(63) Continuation of application No. 11/915,669, filed as application No. PCT/SE2006/000613 on May 24, 2006, now Pat. No. 8,457,417.

(30) Foreign Application Priority Data

May 27, 2005  (SE) .................................. 0501260.4
Jul. 1, 2005   (WO) ................ PCT/SE2005/001070

(51) Int. Cl.
*G06T 9/00*      (2006.01)
*H04N 19/176*    (2014.01)
*H04N 19/186*    (2014.01)

(52) U.S. Cl.
CPC ............... *G06T 9/00* (2013.01); *H04N 19/176* (2014.11); *H04N 19/186* (2014.11); *G06T 9/001* (2013.01)

(58) Field of Classification Search
USPC ................. 382/162, 166, 232, 234, 235, 239; 341/51, 55; 348/234, 253; 375/E7.084, 375/E7.129, E7.137, E7.166
See application file for complete search history.

(56) References Cited

U.S. PATENT DOCUMENTS 5,682,249 A   10/1997 Harrington et al.
5,808,621 A    9/1998 Sundaresan
(Continued)

FOREIGN PATENT DOCUMENTS

EP   1174824 A2    1/2002
EP   1349394 A2   10/2003
(Continued)

OTHER PUBLICATIONS

Fenney, Simon: "Texture Compression using Low-Frequency Signal Modulation". Graphics Hardware (2003). XP-002637329.
(Continued)

*Primary Examiner* — Anh Do

(57) ABSTRACT

In an image-encoding scheme, an input image is decomposed into several image blocks comprising multiple image elements. The image blocks are encoded into encoded block representations. In this encoding, color weights are assigned to the image elements in the block based on their relative positions in the block. At least two color codeword are determined, at least partly based on the color weights. These codewords are representations of at least two color values. The original colors of the image elements are represented by color representations derivable from combinations of the at least two color values weighted by the assigned color weights.

12 Claims, 15 Drawing Sheets

(56) References Cited

U.S. PATENT DOCUMENTS

| | | | |
|---|---|---|---|
| 5,956,431 | A | 9/1999 | Iourcha et al. |
| 6,078,689 | A | 6/2000 | Kunitake et al. |
| 6,266,165 | B1 | 7/2001 | Huang et al. |
| 6,331,902 | B1 | 12/2001 | Lin |
| 8,144,981 | B2 * | 3/2012 | Pettersson et al. ............ 382/166 |
| 8,457,417 | B2 * | 6/2013 | Strom ........................... 382/232 |
| 2004/0151372 | A1 | 8/2004 | Reshetov et al. |

FOREIGN PATENT DOCUMENTS

| | | |
|---|---|---|
| RU | 2024214 C1 | 11/1994 |
| WO | WO 99/18537 | 4/1999 |

OTHER PUBLICATIONS

Strom, et al.: "PACKMAN: Texture Compression for Mobile Phones". Ericsson Research, Lund University/Ericsson Mobile Platforms. 2004.

Strom, et al.: "iPACKMAN: High-Quality, Low-Complexity Texture Compression for Mobile Phones". Ericsson Research, Lund University. 2005.

Akenine-Moller, et al.: "Graphics for the Masses: A Hardware Rasterization Architecture for Mobile Phones". Chalmers University of Technology.

Petterson, et al.: "Texture Compression: THUMB—Two Hues Using Modified Brightness". (2005) XP002396817.

* cited by examiner

| 1ST COLOR CODEWORD | 2ND COLOR CODEWORD | 3RD COLOR CODEWORD | 4TH COLOR CODEWORD |
|---|---|---|---|
| 710 | 720 | 730 | 740 |

Fig. 4

| 1ST COLOR CODEWORD | 2ND COLOR CODEWORD | 3RD COLOR CODEWORD |
|---|---|---|
| 710 | 720 | 730 |

Fig. 6

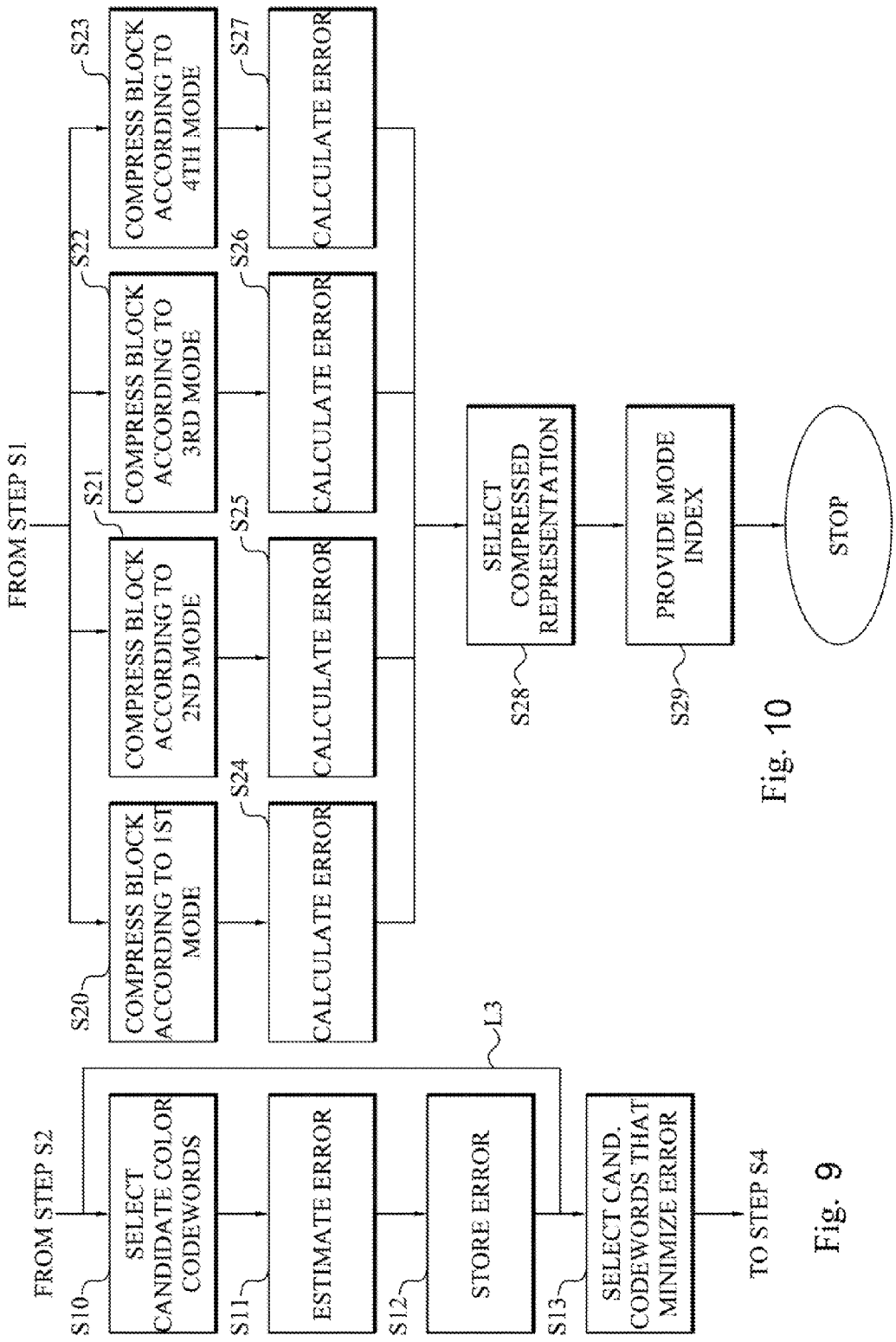

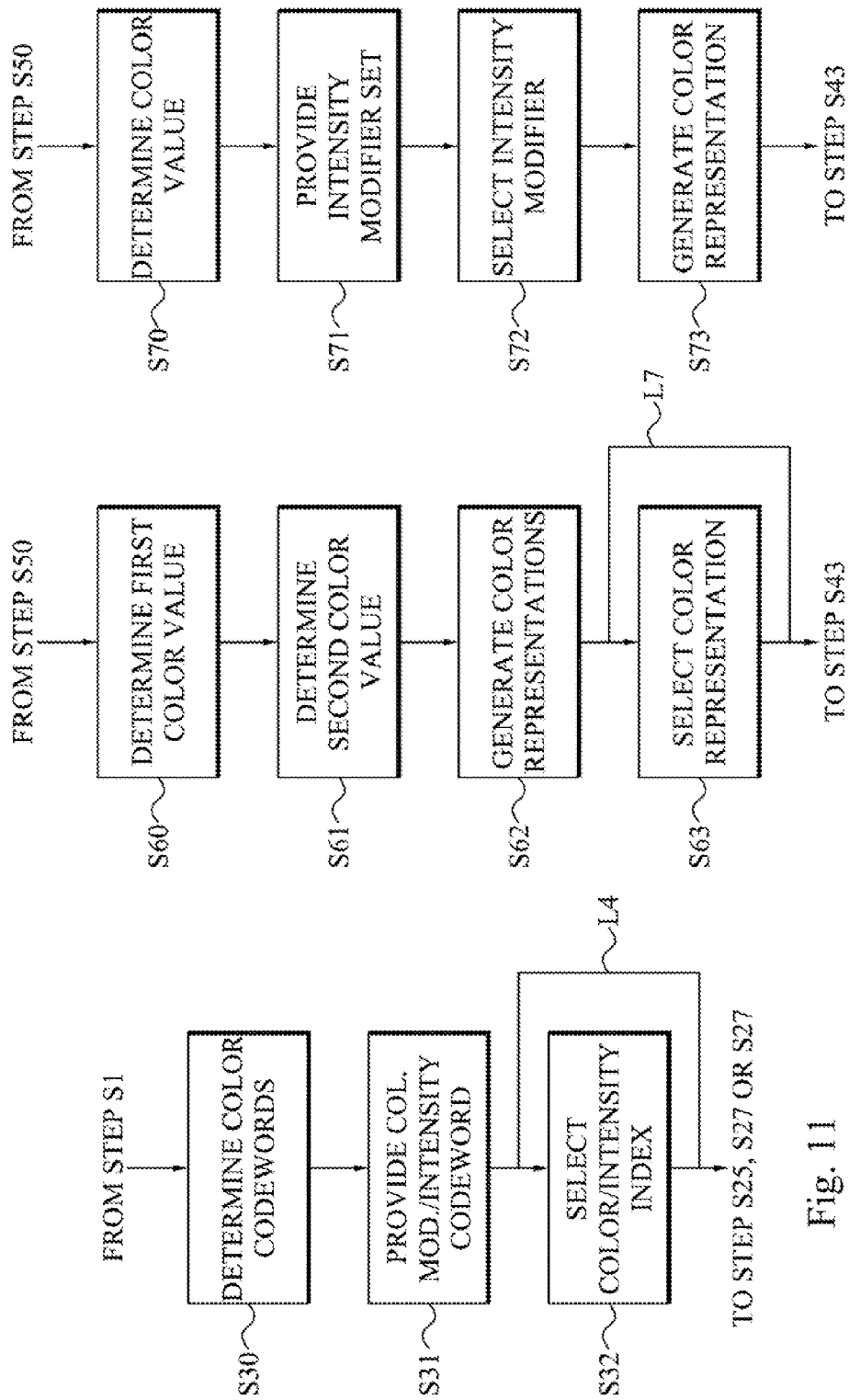

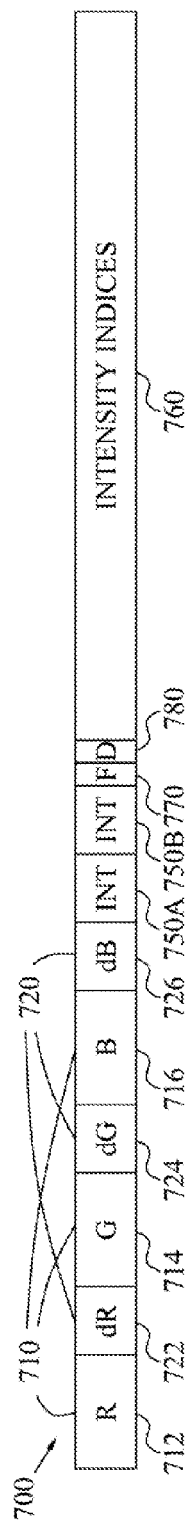
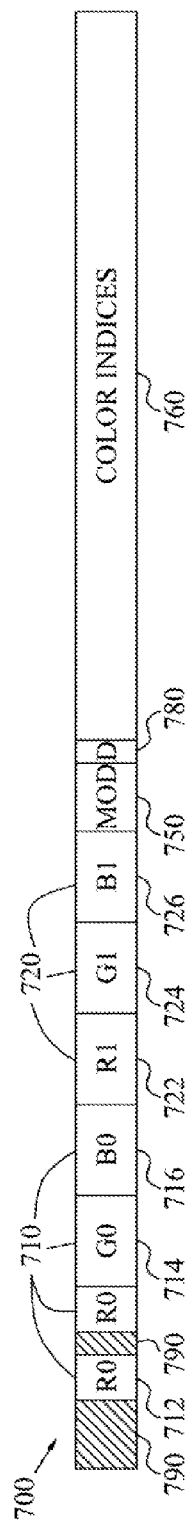
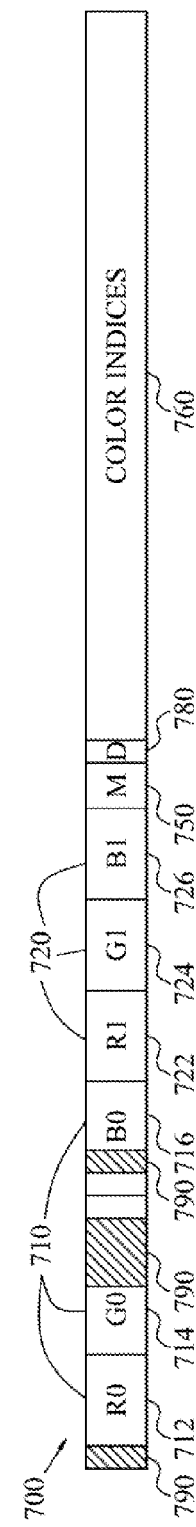
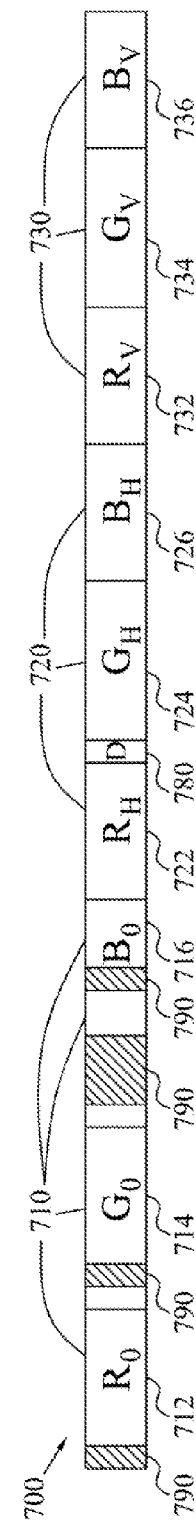

WEIGHT BASED IMAGE PROCESSING

CROSS-REFERENCE TO RELATED APPLICATIONS

This application is a continuation of U.S. application Ser. No. 11/915,669, filed Nov. 27, 2007, now U.S. Pat. No. 8,457,419, which was a 371 National Stage of International Application No. PCT/SE2006/000613, filed May 24, 2006, which claims the benefit of Swedish Application No. 0501260.4, filed May 27, 2005 and PCT/SE2005/001070 filed Jul. 1, 2005, the disclosures of which are incorporated herein by reference.

TECHNICAL FIELD

The present invention generally refers to image processing, and in particular to methods and systems for encoding and decoding images.

BACKGROUND

Presentation and rendering of images and graphics on data processing systems and user terminals, such as computers, and in particular on mobile terminals have increased tremendously the last years. For example, three-dimensional (3D) graphics and images have a number of appealing applications on such terminals, including games, 3D maps and messaging, screen savers and man-machine interfaces.

A 3D graphics rendering process typically comprises three sub-stages. Briefly, a first stage, the application stage, creates several triangles. The corners of these triangles are transformed, projected and lit in a second stage, the geometry stage. In a third stage, the rasterization stage, images, often denoted textures, can be "glued" onto the triangles, increasing the realism of the rendered image. The third stage typically also performs sorting, using a z-buffer.

However, rendering of images and textures, and in particular 3D images and graphics, is a computationally expensive task in terms of memory bandwidth and processing power required for the graphic systems. For example, textures are costly both in terms of memory, the textures must be placed on or cached in fast on-chip memory, and in terms of memory bandwidth, a texture can be accessed several times to draw a single pixel.

In order to reduce the bandwidth and processing power requirements, an image (texture) encoding method or system is typically employed. Such an encoding system should result in more efficient usage of expensive on-chip memory and lower memory bandwidth during rendering and, thus, in lower power consumption and/or faster rendering.

Delp and Mitchell [1] developed a simple scheme, called block truncation coding (BTC) for image compression. Even though their applications were not texture compression per se, several of the other schemes described in this section are based on their ideas. Their scheme compressed grey scale images by considering a block of 4×4 pixels at a time. For such a block, two 8-bit grey scale values were stored, and each pixel in the block then used a single bit to index to one of these grey scales. This resulted in 2 bits per pixel (bpp).

A simple extension, called color cell compression (CCC), of BTC was presented by Campbell et al. [2]. Instead of using an 8-bit grey scale value, the 8-bit value is employed as an index into a color palette. This allows for compression of colored textures at 2 bpp. However, a memory lookup in the palette is required, and the palette is restricted in size.

The S3TC texture compression method by Iourcha et al. [3] is currently probably the most popular scheme. It is used in DirectX and there are extensions for it in OpenGL as well. Their work can be seen as a further extension of CCC. The block site for S3TC is 4×4 pixels that are compressed into 64 bits. Two base colors are stored as 16 bits each, and each pixel stores a two-bit index into a local color palette that consists of the two base colors and two additional colors in-between the base colors. This means that all colors lie on a line in RGB space. S3TC's compression rate is 4 bpp. One disadvantage of S3TC is that only four colors can be used per block.

Penney [4] introduces a radically different scheme that is used in the MBX graphics hardware platform for mobile phones. This scheme uses two low-resolution images and these are bilinearly upscaled during decompression. Each pixel also stores a blendfactor between these two upscaled images. Compression of 4 bpp and 2 bpp are described. 64 bits are used per block. The major disadvantage of Fenny's scheme, which makes it less attractive in real implementations, is that information is needed from neighboring image blocks during decompression, which severely complicates decompression.

PACKMAN is a recent texture compression method developed by Ström and Akenine-Möller [5]. It encodes a block of 2×4 texels (pixels) into 32 bits. Only one color is used per block, but in each pixel this color can be modified in intensity. The major goal of PACKMAN was to allow for minimal decompression complexity. In PACKMAN the chrominance is heavily quantized, which may introduce block artifacts.

In order to improve PACKMAN, Ström and Akenine-Möller developed an improved compression method denoted iPACKMAN//Ericsson Texture Compression (ETC) [6, 7]. In iPACKMAN/ETC two 2×4 image blocks are encoded in common, which allowed for differential encoding of the colors. This made it possible to have finer quantization of the colors, resulting in an increase in quality of about 3 dB. Hence, this compression method passed S3TC in terms of quality and is currently the highest quality texture compression method/system publicly known.

There is still a need to improve image compression and in particular in terms of compressing and decompressing problematic image blocks having certain color characteristics that cannot be efficiently handled by the prior art image processing schemes at a high quality. Such problematic image blocks include blocks having slowly varying transitions between two or more colors.

SUMMARY

The present invention overcomes these and other drawbacks of the prior art arrangements.

It is a general object of the present invention to provide an image processing scheme that effectively can handle image blocks having slowly varying transitions between two or more colors.

This and other objects are met by the invention as defined by the accompanying patent claims.

Briefly, the present invention invokes an image processing in the form of encoding (compressing) an image and decoding (decompressing) an encoded (compressed) image.

According to the invention, an image to be encoded is decomposed into a number of image blocks comprising multiple image elements (pixels, texels or voxels). An image block preferably comprises sixteen image elements and has a size of $2^m \times 2^n$ image elements, where in and n preferably are 2. Each image element in a block is characterized by an image element property, preferably a color, e.g. a 24-bit RGB (red, green, blue) color. The image blocks are then encoded.

In this (lossy) block encoding, color weights are assigned to at least a subset of the image elements in the image block. At least two color codeword that are representations of at least two color values are then determined at least partly based on the assigned color weights. The generated encoded or compressed representation of the image block comprises the at least two color codewords, which can be regarded as quantized color values. As a consequence, the original colors of the image elements in the image block will be represented by color representations derivable from the at least two color values, in turn obtainable from the at least two color codewords. In addition, the color representations of the image elements in the at least one subset are derivable from combinations of the at least two color values weighted by assigned color weights.

This way of representing image blocks effectively handles smoothly varying transitions of at least two colors within an image block and such transitions and color slopes extending over neighboring blocks. Other advantages offered by the present invention will be appreciated upon reading of the below description of the embodiments of the invention.

During decoding or decompression, the at least two color values are determined based on the at least two color codewords. The color weights assigned to an image element to be decoded is then. Finally, a color representation to use for this image element is calculated based on the provided color weights and the determined at least two color values.

The present invention also teaches systems tbr encoding images and image blocks, systems for decoding encoded images and image blocks and user terminals housing such systems.

SHORT DESCRIPTION OF THE DRAWINGS

The invention together with further objects and advantages thereof, may best be understood by making reference to the following description taken together with the accompanying drawings, in which:

FIG. 4 is an illustration of a compressed representation of an image block according to at embodiment of the present invention;

FIG. 6 is an illustration of a compressed representation of an image block according to another embodiment of the present invention;

FIG. 9 is a flow diagram illustrating an embodiment of the determining step of FIG. 1 in more detail;

FIG. 10 is a flow diagram of additional steps of the image encoding/compressing method of FIG. 1 according to a multi-mode implementation of the present invention;

FIG. 11 is a flow diagram illustrating embodiments of compressing steps of FIG. 10 in more detail;

FIGS. 14 to 17 are illustrations of compressed representations of an image block according to the multi-mode implementation;

FIG. 20 is a flow diagram illustrating embodiments of the decompressing step of FIG. 19 in more detail;

FIG. 21 is a flow diagram illustrating another embodiment of the decompressing step of FIG. 19 in more detail;

Figure 22:
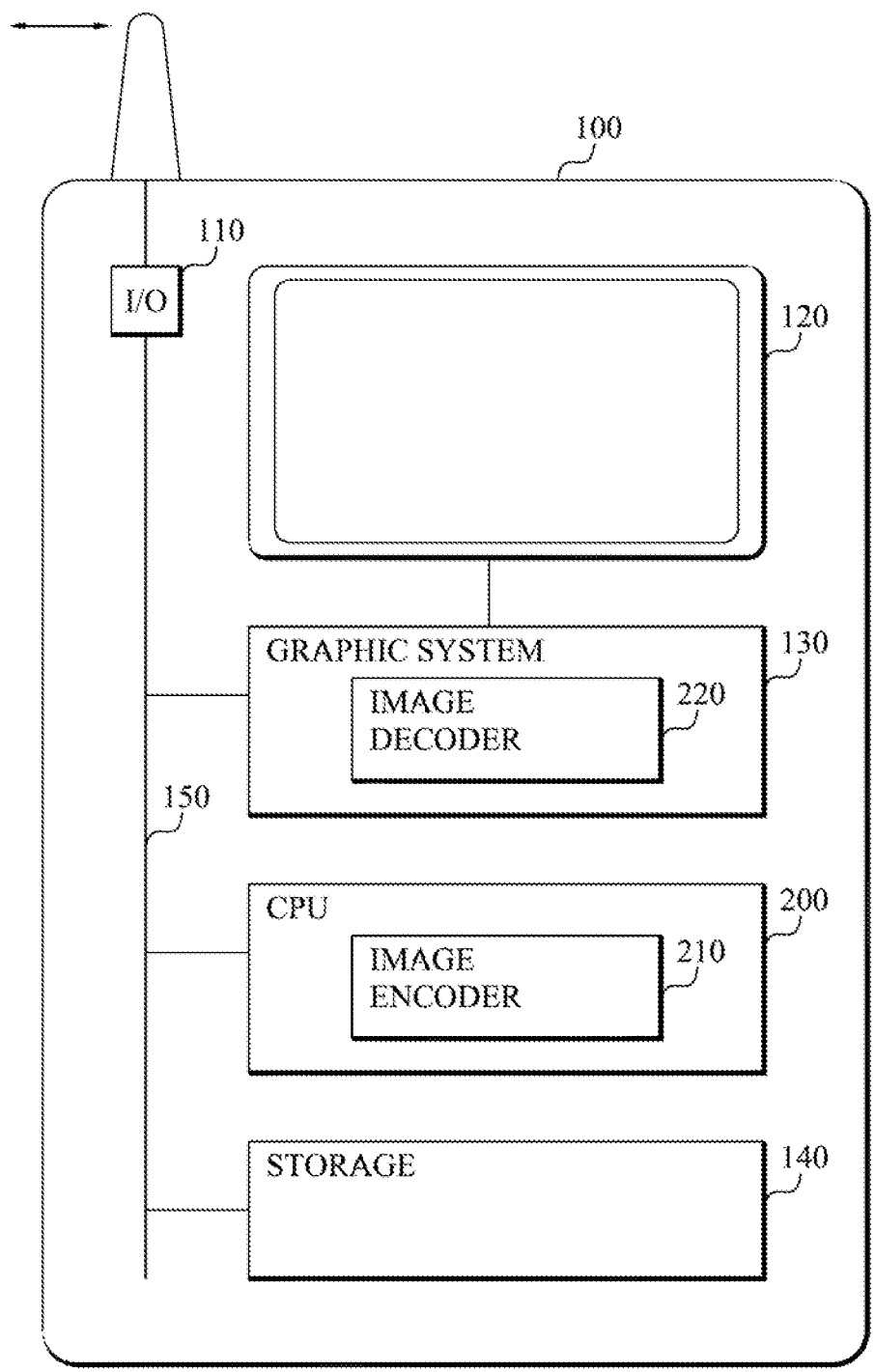
Figure 24:
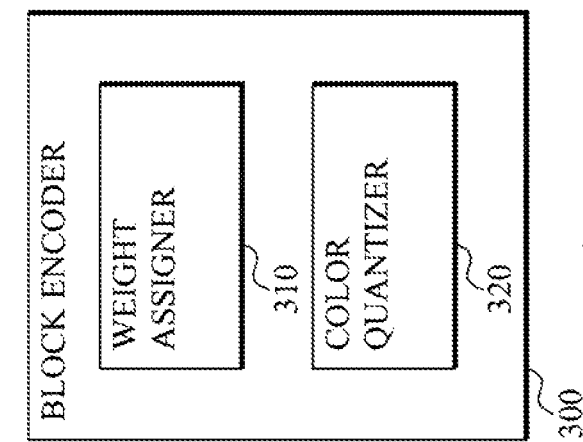
Figure 23:
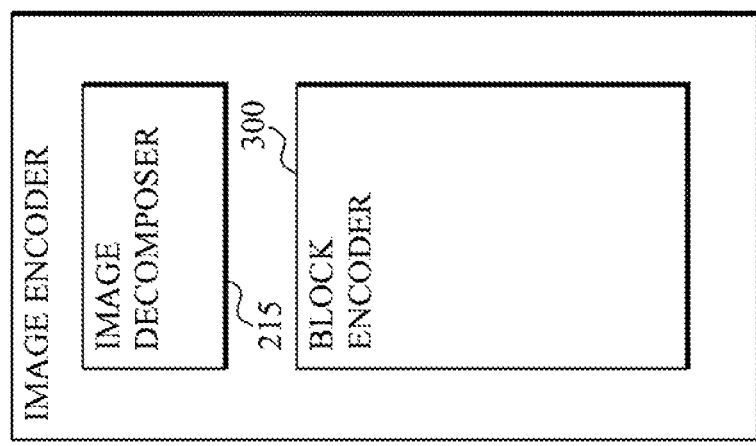
Figure 25:
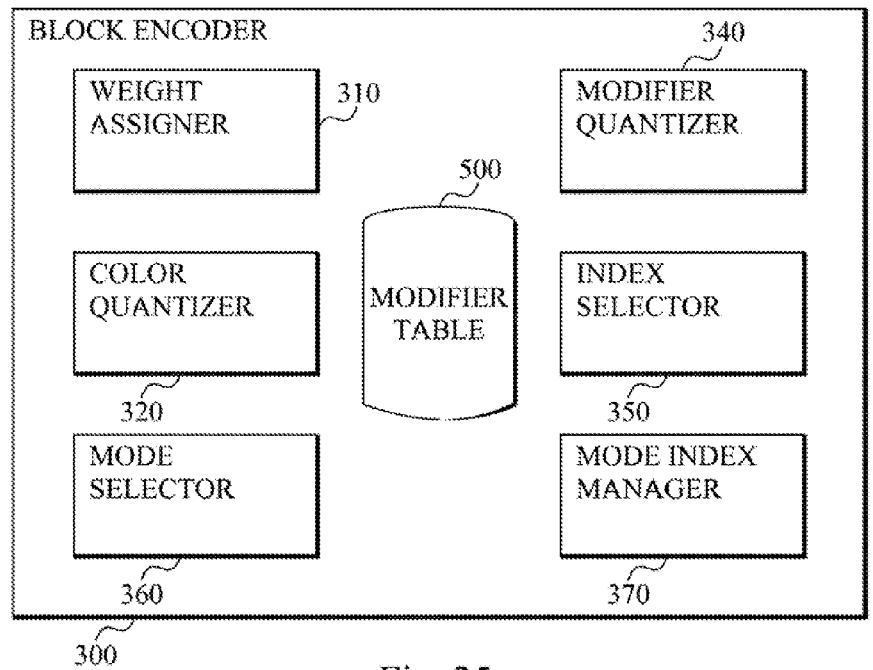
Figure 28:
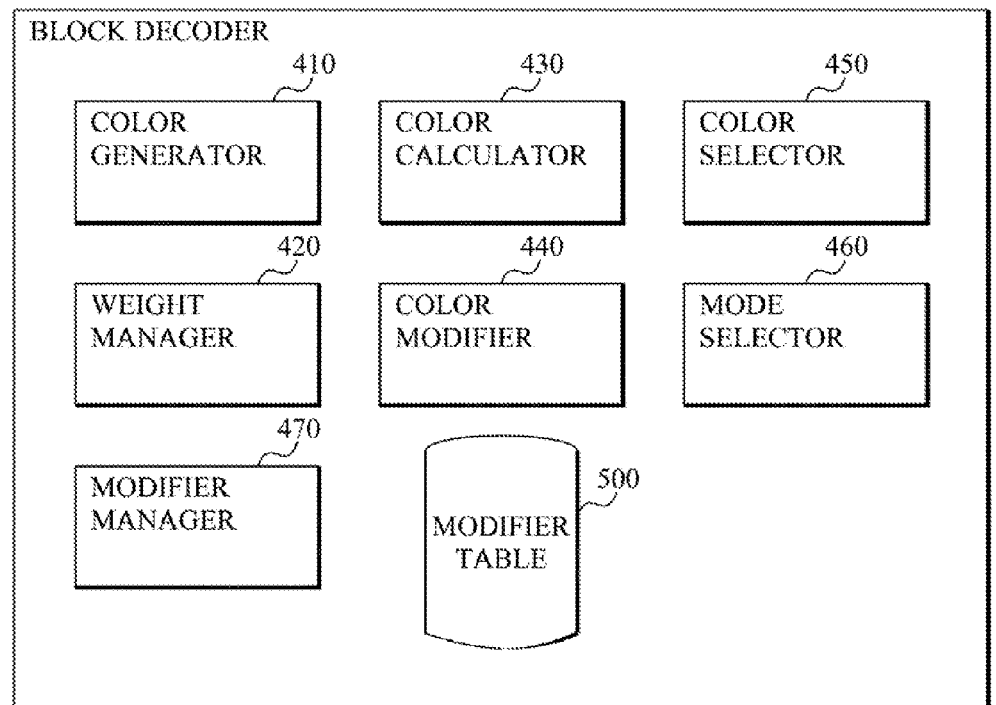
Figure 27:
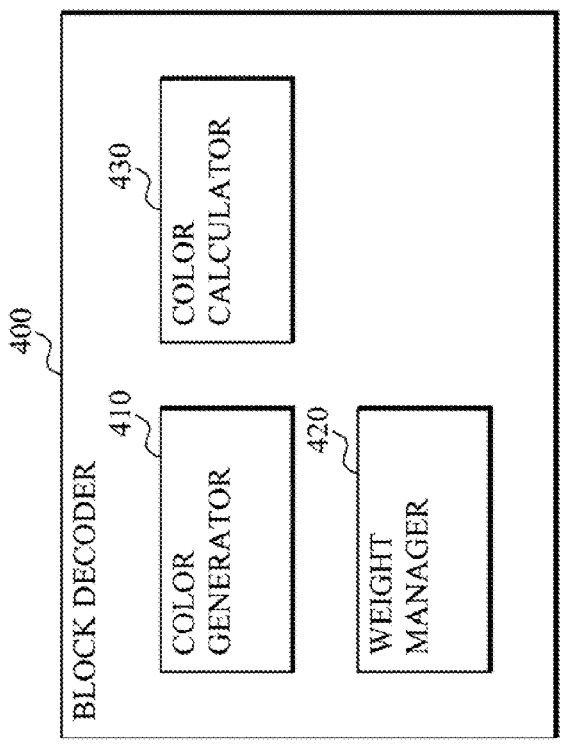
Figure 26:
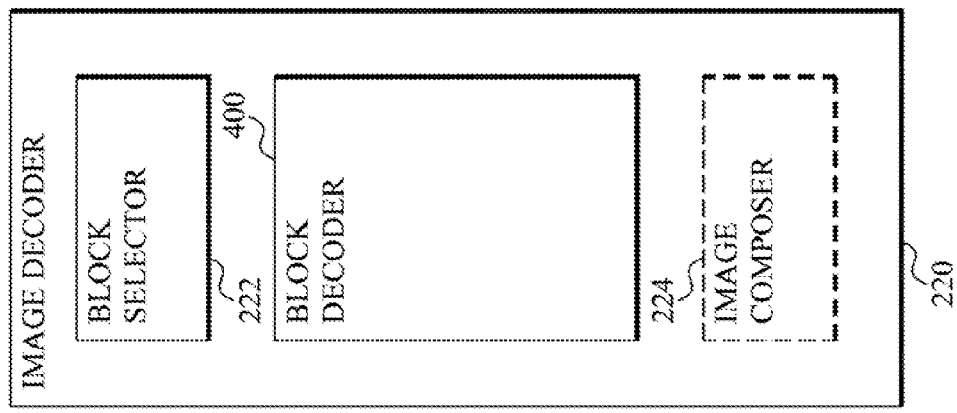

FIG. 22 schematically illustrates an example of a user terminal with an image encoder and decoder according to the present invention;

FIG. 23 is a block diagram schematically illustrating an embodiment of an image encoder according to the present invention;

FIG. 24 is a block diagram schematically illustrating an embodiment of a block encoder according to the present invention;

FIG. 25 is a block diagram schematically illustrating another embodiment of a block encoder according to the present invention;

FIG. 26 is a block diagram schematically illustrating an embodiment of an image decoder according to the present invent on;

FIG. 27 is a block diagram schematically illustrating an embodiment of a block decoder according to the present invention; and FIG. 28 is a block diagram schematically illustrating another embodiment of a block decoder according to the present invention.

DETAILED DESCRIPTION

Throughout the drawings, the same reference characters will be used for corresponding, or similar elements.

The present invention relates to image and graphic processing, and in particular to encoding or compressing images and image blocks and decoding or decompressing encoded (compressed) images and image blocks.

Generally, according to the invention, during image encoding, an image is decomposed or divided into a number of image blocks. Each such image block then comprises multiple image elements having, among others, a certain color. The image blocks are encoded or compressed to generate an encoded/compressed representation of the image.

When an encoded image or graphic primitive subsequently is to be rendered, e.g. displayed on a screen, the relevant image elements of the encoded image blocks are identified and decoded. These decoded image elements are then used to generate a decoded representation of the original image or graphics primitive.

The present invention is well adapted for usage with three-dimensional (3D) graphics, such as games, 3D maps and scenes, 3D messages, e.g. animated messages, screen savers, man-machine interfaces (MMIs), etc., but is not limited thereto. Thus, the invention could also be employed for encoding other types of images or graphics, e.g. one-dimensional (1D), two-dimensional (2D) or 3D images.

In 3D graphics processing, typically several triangles are created and the corresponding screen coordinates of the corners of these triangles are determined. Onto each triangle, an image (or portion of an image), or a so-called texture, is mapped ("glued"). The management of textures is, though, costly for a graphic system, both in terms of utilized memory for storage of textures and in terms of memory bandwidth during, memory accesses, when textures are fetched from the memory. This is a problem particularly for thin clients, such as mobile units and telephones, with limited memory capacity and bandwidth. As a consequence, a texture or image encoding, scheme is often employed. In such a scheme, a texture is typically decomposed or divided into a number of image blocks comprising multiple texels. The image blocks are then encoded and stored in a memory. Note that the size of an encoded (version of an) image block is smaller than the corresponding size of the uncoded version of the image block.

In the present invention the expression "image element" refers to an element in an image block or encoded representation of an image block. This image block, in turn, corresponds to a portion of an image or texture. Thus, according to the invention, an image element could be a texel (texture element) of a (1D, 2D, 3D) texture, a pixel of a (1D or 2D) image or a voxel (volume element) of a 3D image. Generally, an image element is characterized by certain image-element properties, such as a color value. Furthermore, in the following, the term "image" is used to denote any 1D, 2D or 3D image or texture that can be encoded and decoded by means of the present invention, including but not limited to photos, game type textures, text, drawings, etc.

The present invention provides an image processing that is in particular suitable for compressing and decompressing images and image blocks with slowly varying transitions between at least two colors. In the prior art schemes, discussed in the background section, a color palette comprising typically four color values is formed in color space by means of color codewords (S3TC) or color codeword(s) and intensity/color modifier codeword(s) (PACKMAN and iPACKMAN/ETC). Each image element then has a color index associated with one of the colors in the color palette. With such a solution, it is generally hard to processing image elements with slowly varying color transitions.

In clear contrast to these prior art schemes, the present invention assigns different color weights to image elements in an image block. Thereafter, colors to use for the image block are determined based at least partly on the assigned color weights. This means that the original colors of the image elements will be represented by color representations derivable from combinations of the determined colors weighted by the assigned color weights. This potentially allows utilizing unique color representations, depending on the assigned color weights, for each image element in the block, which in turn means a much larger color palette. In addition, the color weights can be set so that also problematic blocks having slowly varying color transitions can be represented at a high image quality.

Compression

Figure 1:
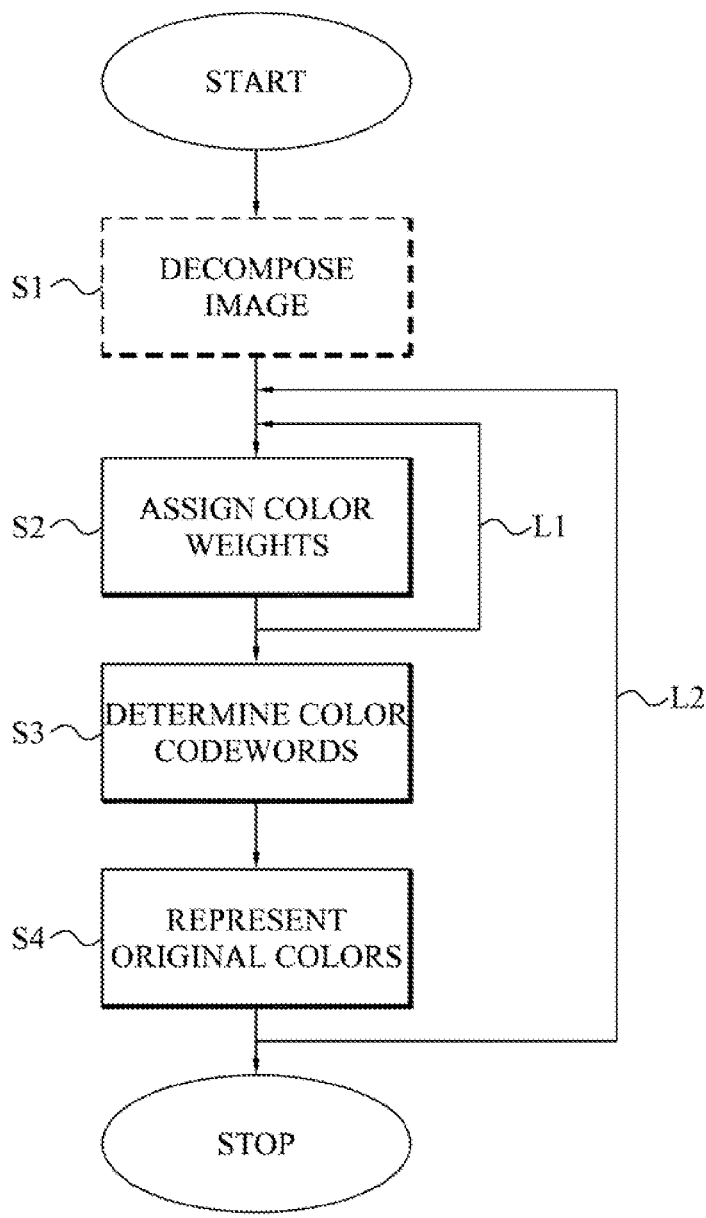
FIG. 1 is a flow diagram illustrating a method of compressing/encoding an image and image block according to the present invention.
Figure 2:
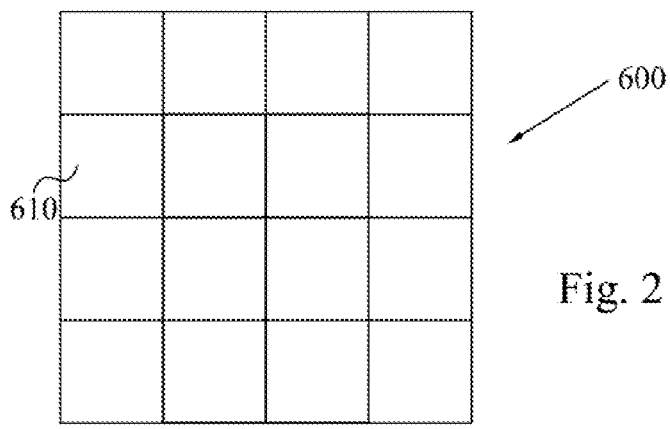
FIG. 2 is an illustration of an example of an image block according to the present invention.

FIG. 1 illustrates a (lossy) method of encoding an image according to the present invention in a first step S1, the image is decomposed or divided into a number of image blocks. Each such image block then comprises multiple image elements. In a preferred embodiment of the invention, an image block comprises sixteen image elements (pixels, texels or voxels) and has a size of $2^m \times 2^n$ image elements, where m=4−n and n=0, 1, 2, 3, 4. More preferably, m and n are both 2. It could also be possible to utilize an image block of size $2^m \times 2^n$ or $2^m \times 2^n \times 2^p$ image elements, where m, n, p are zero or positive integers with the proviso that not all of m, n, p may simultaneously be zero. FIG. 2 schematically illustrates an example of an image block 600 with sixteen image elements 610 according to the present invention. In an alternative embodiment of the present invention, the image is decomposed into a number of image sub-blocks, preferably having a size of 2×4 or 4×2 image elements. In such a case, two such sub-blocks could be handled together during compression to form a 4×4 block 600 as illustrated in FIG. 2. Returning to FIG. 1, the whole image block is preferably decomposed into (non-overlapping) image blocks in step S1. However, in some applications, only a portion of an image is encoded and, thus, only this portion is decomposed into image blocks.

The following steps S2 and S4 perform an encoding or compression of the image blocks. Firstly in step S2, color weights are assigned to at least a subset of the image elements in the image block, which is schematically illustrated by the line L1. The color weights are preferably determined based on the relative position the image elements of the at least one subset have in the image block. These color weights will be used during decompression for weighting different colors determined for the image block to generate color representations used for representing the original ("true") colors of the image elements. For example, assume that two colors ($C_0$ and $C_1$) are determined for the current image block. The color weights assigned in this step S2 can then be $w_0^{xy}$ and $w_1^{xy}$ for image element having position (x,y) in the image block. During compression, the image representation of this image element will be $w_0^{xy} C_0 + w_1^{xy} C_1$, thus a weighted combination, in this case a linear combination, of the two colors.

As is well known in the art a color typically comprises multiple color components, most often three color components depending on the proprietary color space utilized. For example, the colors could be RGB (Red, Green, Blue) colors, colors in the YIN space or YCrCb space, or any other proprietary color space used in image and graphics processing and management, in such a case, the multiple color weights assigned in step S2 could regarded as a color weight vector $$w^{xy} = \begin{bmatrix} w_{R0}^{xy} & w_{G0}^{xy} & w_{B0}^{xy} \\ w_{R1}^{xy} & w_{G1}^{xy} & w_{B1}^{xy} \end{bmatrix}.$$

In this case, the individual component elements in a weight vector could be set individually or at least could be equal. In the case $w_{R0}^{xy} = w_{B0}^{xy} = w_{G0}^{xy}$, the weight vector only comprises two weights $$\begin{bmatrix} w_0^{xy} \\ w_1^{xy} \end{bmatrix}$$

per image element in this illustrative example.

The color weights are preferably assigned for each image element in at least one subset of the image elements in the blocks, which is represented by the line L1. In a first embodiment, the image block comprises N image elements, N is an integer larger than one, and the subset comprises M image elements, where 0≤M<N. This means that no color weights are assigned for the remaining N-M image element(s). In that case, the original color of this (these) remaining image element(s) is represented by one of the color codewords to be determined for the image block. However, this basically corresponds to setting all component elements of one of the color weight vectors to 1 and setting all component elements of the other color weight vector(s) to 0.

Therefore, in another preferred implementation or the present invention, color weights are assigned to all image elements in the block by basically repeating the step S2 for each image element. In this embodiment, at least on the color weights assigned to at least one image elements is preferably different from 0, 1 and −1.

In a next step S3, at least two color codewords are determined for the image block based on or using the assigned color weights. These at least two color codewords are representations of at least two color values. As noted above, the color values could be RGB (Red, Green, Blue) colors, colors in the YUV space or YCrCb space, or any other proprietary color space used in image and graphics processing and management.

The color codewords are preferably in the same color format (space) as the image. However, in some cases, it may be useful to convert the image to a different color space. i.e. having the color codewords in a first color space and the original image in a second different color space.

In a first embodiment of the present invention, two color codewords are determined in this step S3 based on the assigned color weights. However, in a preferred implementation of the present invention three, or sometimes four or mare, color codewords are instead determined based on the color weights. These multiple codewords then represent three, four or more, color values. According to the present invention, it is possible, by basing the color codeword determination on so the assigned color weights, to determine color codewords resulting in high image quality and allowing generation of color representations having slowly varying color transitions.

In a next step S4, the original colors of the multiple image elements in the block are represented by color representations derivable from the at least two color values, in turn being represented by the at least two color codewords determined in step S3. In addition, color representations of the image elements in the at least one subset, i.e. those image elements for which color weights were assigned in step S2, are derivable from combinations of the at least two color values weighted by the assigned color weights.

If the at least one subset comprises a first subset of the image element in the block, the color representations of these image elements are derivable from combinations of the at least two color values weighted by the assigned color weights.

However, color representations of image elements in a second remaining subset of the image elements in the block are selected directly from the color values and therefore do not constitute combinations of multiple color values.

The steps S2 to S4 are preferably repeated for all image blocks provided during the decomposing of step S1 (schematically illustrated by line L2). The result is then a sequence or file of encoded image blocks. The encoded image blocks (encoded representations of the image blocks) could be ordered in a file from left to right and top to bottom in the same order in which they were broken down in the block decomposing of step S1. The method then ends.

The encoded image could be provided to a memory for storage therein until a subsequent rendering, e.g. display, of the image. Furthermore, the encoded image could be provided as a signal of encoded block representations to a transmitter for (wireless or wired) transmission to another unit.

Figure 3:
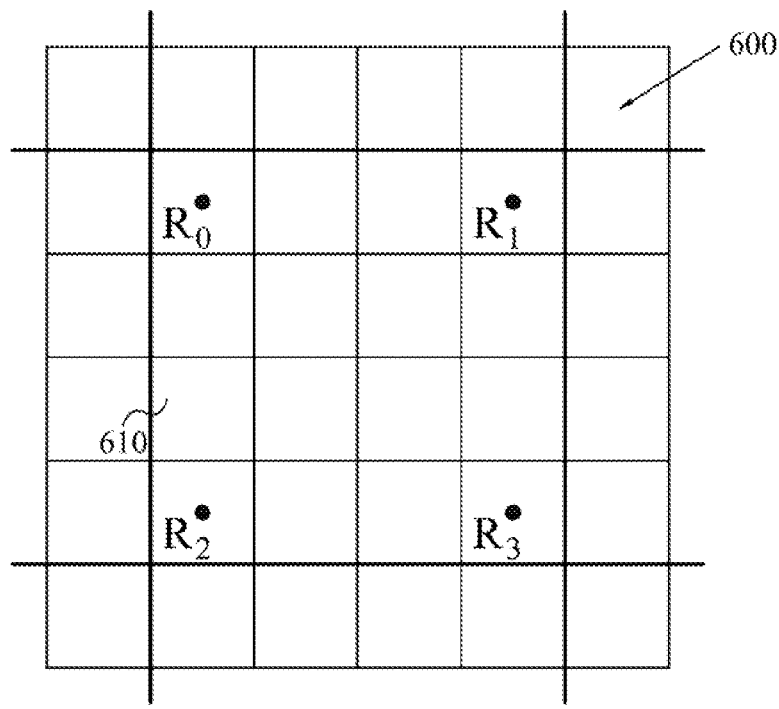
FIG. 3 is a drawing schematically illustrating assignment of color weights according to an embodiment of the present invention.

FIG. 3 is a schematic illustration of an image block 600 in an image or texture to be compressed according to the present invention. In this first implementation of the present invention, four color codewords are to be determined for the image block 600. Each of the four color codewords represent a respective color value, the red components of which are denoted by $R_0$, $R_1$, $R_2$ and $R_3$. This embodiment basically allows for a bilinear upscaling but where all the colors needed for the bilinear upscaling are stored as a compressed representation for the image block. In this embodiment, the image elements 610 forming the corners of the image block 600 have color weights of only ones and zeros. Table 1 illustrates the color weights assigned to the image elements 610 in the block according to this embodiment of the present invention.

TABLE 1

| | color weights | | | |
|---|---|---|---|---|
| Position (x, y) | Color 0 | Color 1 | Color 2 | Color 3 |
| (0, 0) | 1 | 0 | 0 | 0 |
| (1, 0) | 2/3 | 1/3 | 0 | 0 |
| (2, 0) | 1/3 | 2/3 | 0 | 0 |
| (3, 0) | 0 | 1 | 0 | 0 |
| (0, 1) | 2/3 | 0 | 1/3 | 0 |
| (1, 1) | 4/9 | 2/9 | 2/9 | 1/9 |
| (2, 1) | 2/9 | 4/9 | 1/9 | 2/9 |
| (3, 1) | 0 | 2/3 | 0 | 1/3 |
| (0, 2) | 1/3 | 0 | 2/3 | 0 |
| (1, 2) | 2/9 | 1/9 | 4/9 | 2/9 |
| (2, 2) | 1/9 | 2/9 | 2/9 | 4/9 |
| (3, 2) | 0 | 1/3 | 0 | 2/3 |
| (0, 3) | 0 | 0 | 1 | 0 |
| (1, 3) | 0 | 0 | 2/3 | 1/3 |
| (2, 3) | 0 | 0 | 1/3 | 2/3 |
| (3, 3) | 0 | 0 | 0 | 1 |

This means that the color representations of the image block illustrated in FIG. 3 and having assigned color weights according to Table 1 above will have red components according to Table 2 below.

TABLE 2

| color combinations | | | |
|---|---|---|---|
| $R_0$ | $\frac{2}{3}R_0 + \frac{1}{3}R_1$ | $\frac{1}{3}R_0 + \frac{2}{3}R_1$ | $R_1$ |
| $\frac{2}{3}R_0 + \frac{1}{3}R_2$ | $\frac{4}{9}R_0 + \frac{2}{9}R_1 + \frac{2}{9}R_2 + \frac{1}{9}R_3$ | $\frac{2}{9}R_0 + \frac{4}{9}R_1 + \frac{1}{9}R_2 + \frac{2}{9}R_3$ | $\frac{2}{3}R_1 + \frac{1}{3}R_3$ |
| $\frac{1}{3}R_0 + \frac{2}{3}R_2$ | $\frac{2}{9}R_0 + \frac{1}{9}R_1 + \frac{4}{9}R_2 + \frac{2}{9}R_3$ | $\frac{1}{9}R_0 + \frac{2}{9}R_1 + \frac{2}{9}R_2 + \frac{4}{9}R_3$ | $\frac{1}{3}R_1 + \frac{2}{3}R_3$ |
| $R_2$ | $\frac{2}{3}R_2 + \frac{1}{3}R_3$ | $\frac{1}{3}R_2 + \frac{2}{3}R_3$ | $R_3$ |

The blue and green components are preferably handled in the same way, i.e. basically by exchanging $R_z$ with $B_z$ or $G_z$, where z=0, 1, 2, 3.

As can be seen from Table 2, the red (green and blue) color components of twelve of the image elements are derivable as weighted linear combinations of at least of the color values ($R_0$, $R_1$, $R_2$, $R_3$) represented by the four color codewords. However, the red (green and blue) color components of the four corner image elements are each derived directly from one of the color values.

In this embodiment, when one move along the first row ($R_0$ to $R_1$), the third row ($R_2$ to $R_3$), the first column ($R_0$ to $R_2$) and the third column ($R_1$ to $R_3$) in Table 2, the red color component of the color representations of the image elements in these tows and columns change monotonically (unless the two end values are equal). For example, if $R_1 > R_0$, the red component value increases monotonically along the first row, i.e. when moving from image element (0,0) to image element (0,3). Correspondingly, if $R_2 < R_0$, the red component value decreased monotonically along the first column (from image element (0,0) to (3,0)). If the same color weights are used also for the green and/or blue color components also these will change monotonically for these row and columns. In the present invention, a row or column is denoted "one-dimensional array of image elements". This means that at least one color component of color representations change monotonically along at least one one-dimensional array of image elements. This allows for smooth transitions of colors and therefore image blocks having such color distributions can be represented by the present invention at a high image quality.

FIG. 4 illustrates a compressed representation 700 of the image block illustrated in FIG. 3 that has been compressed according to an embodiment of the present invention. The representation 700 (encoded or compressed image block) comprises a first color codeword 710, a second color codeword 720, a third color codeword 730 and a fourth color codeword 740. Note that the mutual order of the codewords 710, 720, 730, 740 of the encoded image block 700 may differ front what is illustrated in the figure.

The color weights assigned to image elements in the block are in this case pre-defined and will be used for all image blocks of the image compressed according to this embodiment of the present invention. This means that if all image blocks of an image are compressed according to the present invention, the color weights listed, in Table 1 will be used for all image blocks. However, note that the four color codewords can be different thr different blocks, thereby effectively resulting in different color representations for the image blocks.

It is however anticipated by the present invention that information of the color weights assigned to image elements in the image block can be included as a part of the compressed block representation 700. For example, assume that there exist multiple weight sets that can be used for the image blocks. Each such weight set then comprises color weights assigned to image elements of at least one subset of the elements in the block. A first such weight set can include the color weights listed in Table 1 above. A second set can then have different weights for at least one of these image elements. In such a case, the compressed block representation 700 preferably comprises a weight set index or weight codeword representing the color weight set used for the current image block. A single bit ($0_{bin}$ and $1_{bin}$) can be used as weight codeword to discriminate between two weight sets, whereas two or more bits are required if more than two sets are available. In such a solution, different image blocks of an image can be compressed using different color weight distributions.

If 64 bits are assigned for the compressed image block 700, 16 bits can be used per color codeword 710, 720, 730, 740 and each color codeword 710, 720, 730, 740 can be in the form of RGB565. More bits are preferably spent on the green components since the green component gives a disproportionate contribution to the perception of intensity.

However, the present invention is, as will thoroughly be discussed herein, preferably used as an auxiliary mode to the iPACKMAN/ETC scheme mentioned in the foregoing. In such a case, only 57 bits are available for encoding the four color codewords 710, 720, 730, 740 (the remaining seven bits will be used as mode index for discriminating between this auxiliary mode, iPACKMAN/ETC and other auxiliary modes). Four color codewords 710, 720, 730, 740 with three components each need to be encoded using only 57 bits and a possible solution could be to use a RGB554 format, resulting in 56 bits in total. The remaining bit can be used as weight codeword or boost one of the color components of one of the codewords 710, 720, 730, 740.

The embodiment present in FIGS. 3 and 4 and Table 1 has a drawback in that the color resolution obtainable for the color codewords 710, 720, 730, 740 is rather low, especially when employing the present invention as a complement to iPACKMAN/ETC and each codeword 710, 720, 730, 740 is in the format of RGB554. In this case, particularly the low resolution of the blue component will give rise to artifacts.

Figure 5:
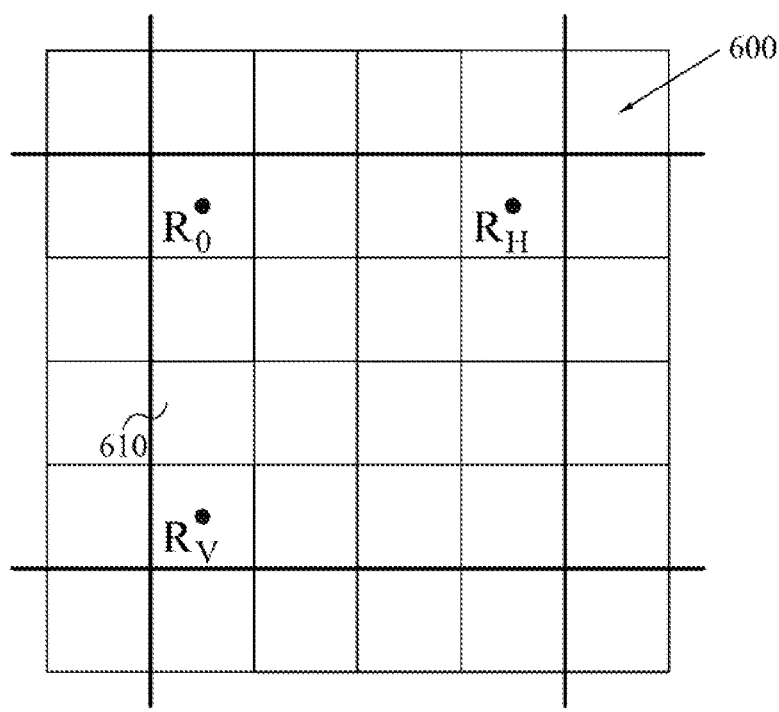
FIG. 5 is a drawing schematically illustrating assignment of color weights according to another embodiment of the present invention.

In a preferred implementation of the present invention, a plane is instead preferably used to approximate the color surface and provide the color weights instead of bilinear function. This is schematically illustrated. In FIG. 5. Compared to FIG. 3 and the bilinear embodiment described above, only three color codewords are determined per image block 600. This means that three color values are represented by these codewords and in FIG. 5, the red components ($R_0$, $R_H$, $R_V$) of these color values have been illustrated.

The color representations and color weights of the image elements 610 in the image block 600 can be calculated using the following formula:

$$R(x, y) = \frac{x}{3}(R_H - R_0) + \frac{y}{3}(R_V - R_0) + R_0 \quad w_0^{xy} = 1 - \frac{x}{3} - \frac{y}{3}$$

$$G(x, y) = \frac{x}{3}(G_H - G_0) + \frac{y}{3}(G_V - G_0) + G_0 \quad w_H^{xy} = \frac{x}{3}$$

$$B(x, y) = \frac{x}{3}(B_H - B_0) + \frac{y}{3}(B_V - B_0) + B_0 \quad w_V^{xy} = \frac{y}{3}$$

This means that the color representations of the image elements 610 in positions (0,0), (0,3) and (3,0) can be directly selected from the color values represented by the three codewords, resulting in $(R_0, G_0, B_0)$ for image element (0,0), $(R_H, G_H, B_H)$ for image element (3,0) and $(R_V, G_V, B_V)$ for image element (0,3) in this illustrative example. This corresponds to the following color weights to the these image elements $w^{00}=[1\ 0\ 0]$, $w^{30}=[0\ 1\ 0]$ and $w^{03}=[0\ 0\ 1]$.

The color weights assigned to image blocks compressed according to this embodiment of the present invention are distributed among the image elements according to the Table 3 below.

TABLE 3

| | color weights | | |
|---|---|---|---|
| Position (x, y) | Color 0 | Color H | Color V |
| (0, 0) | 1 | 0 | 0 |
| (1, 0) | 2/3 | 1/3 | 0 |
| (2, 0) | 1/3 | 2/3 | 0 |
| (3, 0) | 0 | 1 | 0 |
| (0, 1) | 2/3 | 0 | 1/3 |
| (1, 1) | 1/3 | 1/3 | 1/3 |
| (2, 1) | 0 | 2/3 | 1/3 |
| (3, 1) | -1/3 | 1 | 1/3 |
| (0, 2) | 1/3 | 0 | 2/3 |
| (1, 2) | 0 | 1/3 | 2/3 |
| (2, 2) | -1/3 | 2/3 | 2/3 |
| (3, 2) | -2/3 | 1 | 2/3 |
| (0, 3) | 0 | 0 | 1 |
| (1, 3) | -1/3 | 1/3 | 1 |
| (2, 3) | -2/3 | 2/3 | 1 |
| (3, 3) | -1 | 1 | 1 |

This means that the color representations of the image block illustrated in FIG. 5 and having assigned color weights according to Table 3 above will have red components according to Table 4 below.

TABLE 4

| color representations | | | |
|---|---|---|---|
| $R_0$ | $\frac{2}{3}R_0 + \frac{1}{3}R_H$ | $\frac{1}{3}R_0 + \frac{2}{3}R_H$ | $R_H$ |
| $\frac{2}{3}R_0 + \frac{1}{3}R_V$ | $\frac{1}{3}R_0 + \frac{1}{3}R_H + \frac{1}{3}R_V$ | $\frac{2}{3}R_H + \frac{1}{3}R_V$ | $-\frac{1}{3}R_0 + R_H + \frac{1}{3}R_V$ |
| $\frac{1}{3}R_0 + \frac{2}{3}R_V$ | $\frac{1}{3}R_H + \frac{2}{3}R_V$ | $-\frac{1}{3}R_0 + \frac{2}{3}R_H + \frac{2}{3}R_V$ | $-\frac{2}{3}R_0 + R_H + \frac{2}{3}R_V$ |
| $R_V$ | $-\frac{1}{3}R_0 + \frac{1}{3}R_H + R_V$ | $-\frac{2}{3}R_0 + \frac{2}{3}R_H + R_V$ | $-R_0 + R_V + R_H$ |

The blue and green components are preferably handled in the same way, i.e. basically by exchanging $R_z$ with $B_z$ or $G_z$, where z=0, 1, 2, 3.

Also in this case the color components increase or decrease monotonically when moving along the first row and first column in Table 4.

FIG. 6 illustrates a compressed representation 700 of the image block illustrated in FIG. 5 that has been compressed according to this embodiment of the present invention. The representation 700 (encoded or compressed image block) comprises a rust color codeword 710, a second color codeword 720 and a third color codeword 730. Note that the mutual order of the codewords 710. 720, 730 of the encoded image block 700 may differ from what is illustrated in the figure.

The color codewords 710, 720, 730 can now be represented by the RGB676 color quantization, resulting ma total size for the three codewords of 57 bits. This means that this embodiment can advantageously be used as a complement and auxiliary mode to iPACKMAN/ETC as described above. RGB676 allows for a higher resolution as compared to the previous (RGB554) embodiment. Alternatively, if the present invention is used as a stand-alone scheme, the color codewords 710, 720, 730 can be represented as RGB777 and the remaining bit can be used as e.g. weight codeword or boost a color component of one of the codewords 710, 720, 730.

Instead of employing three color codewords 710, 720, 730 allowing calculation of a color value directly from a codeword 710, 720, 730, so-called differential codewords can be used. In such a case, the first color codeword 710 can be determined as described above, i.e. comprising three quantized color components, e.g. in the form of RGB777. The first color value $(R_0, G_0, B_0)$ can then be obtained directly from this first codeword 710 by expanding the quantized color components. The other two codewords 720, 730 instead code a distance in color space from this first color value. Thus, the two codewords 720, 730 could represent $dR_H dG_H dB_H 666$ and $dR_V dG_V dB_V 666$, where each of the components $dW_z$, W=R, G, B and z=H, V, represents a number in the interval [−31, 32]. The other two color values are then obtained according to the following formula:

$R_{H/V} = R_0 + dR_{H/V}$ $G_{H/V} = G_0 + dG_{H/V}$ $B_{H/V} = B_0 + dB_{H/V}$

The embodiments described in connection with FIGS. 3 and 5, however, have a few drawbacks. Firstly, several of the assigned, color weights involve division by three or powers of three ($9=3^2$), which is rather expensive to perform when implementing the decompression in hardware. Another drawback with these patterns and color weight assignments is that it is difficult to create ramps of constant slope. For example, if $R_H$, $G_H$, $B_H$ in one block is set to $R_0$, $G_0$, $B_0$ in the previous block, there will be two image elements having a same color representation next to each other, breaking the slope. Thus, although smooth color transition can be represented at a high quality within a given block, it is more difficult to encode such a smooth color transition over neighboring image blocks.

Figure 7:
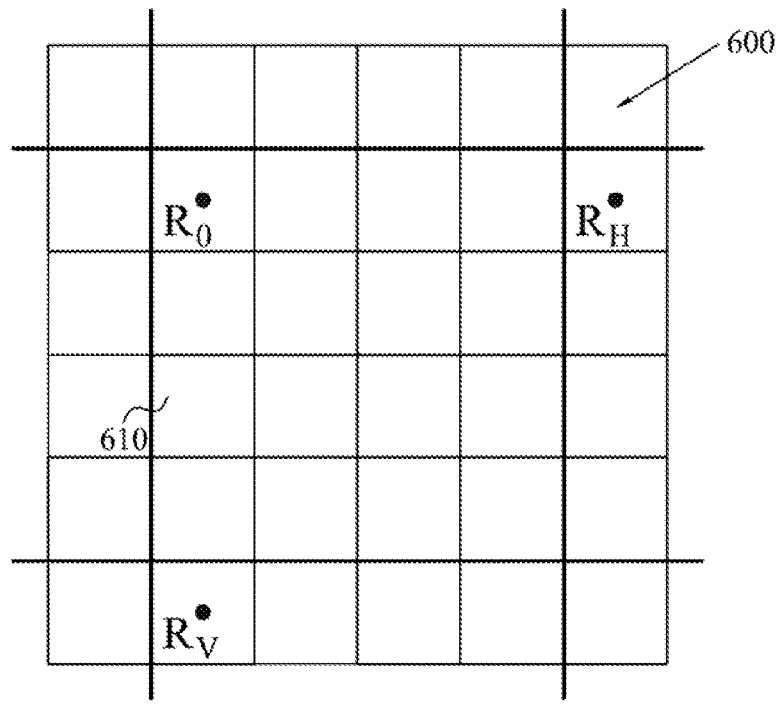
FIG. 7 is a drawing schematically illustrating assignment of color weights according to a further embodiment of the present invention.

FIG. 7 illustrates an embodiment of the present invention, where the color weight assignment is performed in a way to solve the two drawbacks mentioned above. In this embodiment, the color weights are preferably selected so that only a single image element 610 in the block 600 has color weights constituting of a 1 and the rest 0. This means that this single image element 610, preferably a corner image element, has its original color represented by a color value derived from only one of the three color codewords.

The way of positioning the color values as illustrated in FIG. 7, results in the following formula for calculating, the color representations and color weights of the image elements 610 in the image block 600:

$$R(x, y) = \frac{x}{4}(R_H - R_0) + \frac{y}{4}(R_V - R_0) + R_0 \quad w_0^{xy} = 1 - \frac{x}{4} - \frac{y}{4}$$

$$G(x, y) = \frac{x}{4}(G_H - G_0) + \frac{y}{4}(G_V - G_0) + G_0 \quad w_H^{xy} = \frac{x}{4}$$

$$B(x, y) = \frac{x}{4}(B_H - B_0) + \frac{y}{4}(B_V - B_0) + B_0 \quad w_V^{xy} = \frac{y}{4}$$

The color weights assigned to image blocks compressed according to this embodiment of the present invention are distributed among the image elements according to the Table 5 below.

TABLE 5

| | color weights | | |
|---|---|---|---|
| Position (x, y) | Color 0 | Color H | Color V |
| (0, 0) | 1 | 0 | 0 |
| (1, 0) | ¾ | ¼ | 0 |
| (2, 0) | ½ | ½ | 0 |
| (3, 0) | ¼ | ¾ | 0 |
| (0, 1) | ¾ | 0 | ¼ |
| (1, 1) | ½ | ¼ | ¼ |
| (2, 1) | ¼ | ½ | ¼ |
| (3, 1) | 0 | ¾ | ¼ |
| (0, 2) | ½ | 0 | ½ |
| (1, 2) | ¼ | ¼ | ½ |
| (2, 2) | 0 | ½ | ½ |
| (3, 2) | −¼ | ¾ | ½ |
| (0, 3) | ¼ | 0 | ¾ |
| (1, 3) | 0 | ¼ | ¾ |
| (2, 3) | −¼ | ½ | ¾ |
| (3, 3) | −½ | ¾ | ¾ |

This means that the color representations of the image block illustrated in FIG. 7 and having assigned color weights according to Table 5 above will have red components according to Table 6 below.

TABLE 6

| | color representations | | |
|---|---|---|---|
| $R_0$ | $\frac{3}{4}R_0 + \frac{1}{4}R_H$ | $\frac{1}{2}R_0 + \frac{1}{2}R_H$ | $\frac{1}{4}R_0 + \frac{3}{4}R_H$ |
| $\frac{3}{4}R_0 + \frac{1}{4}R_V$ | $\frac{1}{2}R_0 + \frac{1}{4}R_H + \frac{1}{4}R_V$ | $\frac{1}{4}R_0 + \frac{1}{2}R_H + \frac{1}{4}R_V$ | $\frac{3}{4}R_H + \frac{1}{4}R_V$ |
| $\frac{1}{2}R_0 + \frac{1}{2}R_V$ | $\frac{1}{4}R_0 + \frac{1}{4}R_H + \frac{1}{2}R_V$ | $\frac{1}{2}R_H + \frac{1}{2}R_V$ | $-\frac{1}{4}R_0 + \frac{3}{4}R_H + \frac{1}{2}R_V$ |
| $\frac{1}{4}R_0 + \frac{3}{4}R_V$ | $\frac{1}{4}R_H + \frac{3}{4}R_V$ | $-\frac{1}{4}R_0 + \frac{1}{2}R_H + \frac{3}{4}R_V$ | $-\frac{1}{2}R_0 + \frac{3}{4}R_V + \frac{3}{4}R_H$ |

The blue and green components are preferably handled in the same way, i.e. basically by exchanging $R_z$ with $B_z$ or $G_z$, where z=0, 1, 2, 3.

Also in this case, the color components increase or decrease monotonically when moving along the first row and first column in Table 6.

The compressed block representation for this embodiment is illustrated FIG. 6 and the discussion in connection with this figure also applies to this embodiment.

In this embodiment, the color weights involve division by two or four, which is trivial to implement in hardware. In addition, the embodiment allows for continuity of color slope (color transitions) over block limits. This is possible by setting $R_H$ (or $R_V$) in one block to $R_0$ of the previous block, which results in a perfect slope. A further advantage of this embodiment is that the precision of the color representations that are derivable from the color codewords and the color weights increases further since the color can change in steps of ¼ instead of ⅓ with each image element.

Further embodiments based on the same theme as FIG. 7 can be obtained by rotating the positions of $R_0$, $R_H$ and $R_V$ a quarter, a half or three quarters of a turn, respectively.

Generally, in a more general context, the color weights assigned to the image elements according to the present invention can be selected, so that the color values represented by the color codewords could be regarded as all positioned within the image block (see FIGS. 3 and 5), some are positioned within the image block and some are positioned outside the block (see FIG. 7) or all could be positioned outside the block. The relative position of the color values in relation to the block defines the (planar) equation used for obtaining the color weights for the image elements. In a most preferred embodiment of the present invention, all the color values are not positioned on a same line (column/row) in the block.

Figure 8:
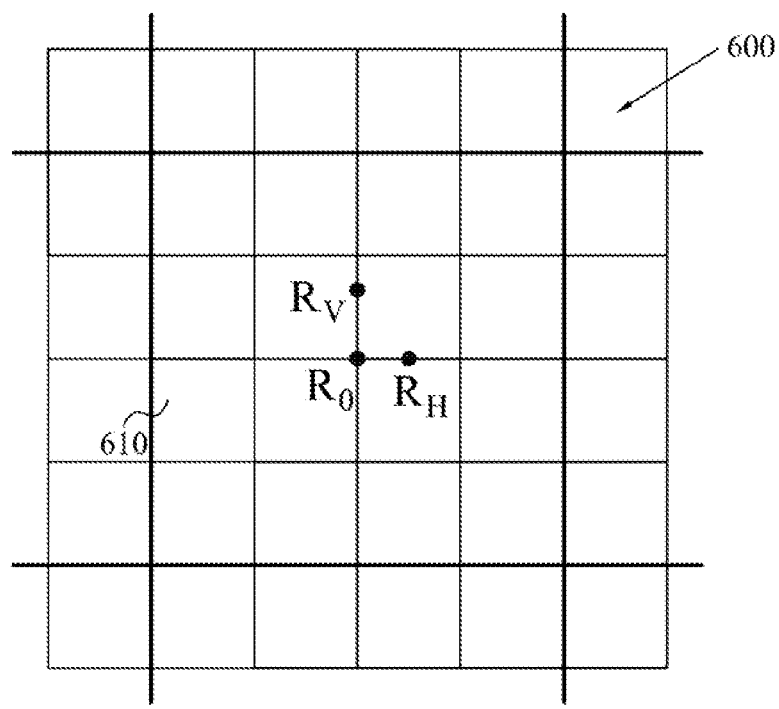
FIG. 8 is a drawing schematically illustrating assignment of color weights according to yet another embodiment of the present invention.

It is anticipated by the present invention that color weights can be selected to represent positions of the color values in the block 600 so that the color values or points are not positioned in the middle of image elements 610, which is schematically illustrated in FIG. 8.

The formula for the plane will then be:

$$R(x,y)=2x(R_H-R_0)-2y(R_V-R_0)+R_0-3R_H+3R_V$$

$$G(x,y)=2x(G_H-G_0)-2y(G_V-G_0)+G_0-3G_H+3G_V$$

$$B(x,y)=2x(B_H-B_0)-2y(B_V-B_0)+B_0-3B_H+3B_V$$

and the color weights are represented by the equations:

$$w_0^{xy}=1-2x+2y$$

$$w_H^{xy}=-3+2x$$

$$w_V^{xy}=3-2y$$

The color weights assigned to image blocks compressed according to this embodiment of the present invention are distributed among the image elements according to the Table 7 below.

TABLE 7

| | color weights | | |
|---|---|---|---|
| Position (x, y) | Color 0 | Color H | Color V |
| (0, 0) | 1 | −3 | 3 |
| (1, 0) | −1 | −1 | 3 |
| (2, 0) | −3 | 1 | 3 |
| (3, 0) | −5 | 3 | 3 |
| (0, 1) | 3 | −3 | 1 |
| (1, 1) | 1 | −1 | 1 |
| (2, 1) | −1 | 1 | 1 |
| (3, 1) | −3 | 3 | 1 |
| (0, 2) | 5 | −3 | −1 |
| (1, 2) | 3 | −1 | −1 |
| (2, 2) | 1 | 1 | −1 |
| (3, 2) | −1 | 3 | −1 |
| (0, 3) | 7 | −3 | −3 |
| (1, 3) | 5 | −1 | −3 |
| (2, 3) | 3 | 1 | −3 |
| (3, 3) | 1 | 3 | −3 |

The present invention, thus, involves assigning color weights to some or all image elements in the block and then determining color codewords based. On the weights, where color representations of the image elements are derivable from weighted, using the weights assigned to the image elements, combinations of color values represented by the codewords. This concept can of course be extended to different number of multiple color codewords and different color weight assignments. In a preferred implementation, at least one weight of at least one image element is different than 0, 1 and −1. Thus, employing three color codewords, means that color weights can be assigned so that a planar interpolation of color values is possible. If instead four or five codewords are employed for an image block, bilinear and Gaussian interpolation can be used, respectively. In the preferred implementation, the color weights are set to reflect that at least one of the color values represented by color codewords can be regarded as placed outside of the image block. This allows for good approximation of very slowly varying color—slower than if all color values are regarded as places inside the block (compare FIG. 5 and FIG. 7).

FIG. 9 is a flow diagram illustrating an embodiment of the determining step of FIG. 1 in more detail. The method continues from step S2 of FIG. 1. In step S10 candidate color codewords that are representations of candidate color values are selected. These candidate codewords can be selected randomly or be the smallest or largest possible candidate color codewords, such as a sequence of 19 $0_{bin}$ (smallest possible codeword, representing color value (0, 0, 0)) or a sequence of 19 $1_{bin}$ (largest possible codeword, representing color value (255, 255, 255)). The three color components R, G, B can be determined separately, i.e. basically running three parallel or subsequent processes. The discussion below is therefore limited to only one color component.

In a next step S11, the red color representation components for the image elements in the block obtained with this selection of candidate color codeword components is calculated using the assigned color weights. This corresponds to replacing $R_0$, $R_H$ and $R_V$ ($R_0$, $R_1$, $R_2$, $R_3$ and $R_4$) in the image blocks disclosed above with the red components of the candidate color value. The error of representing the red component of the image elements with these candidate color representation components are then estimated in step S11.

$$\varepsilon^2 = \sum_{y=0}^{3} \sum_{x=0}^{3} \left( \begin{bmatrix} w_0^{xy} & w_H^{xy} & w_V^{xy} \end{bmatrix} \begin{bmatrix} R_0^c \\ R_H^c \\ R_V^c \end{bmatrix} - \overline{R}^{xy} \right)^2$$

In the error formula above, $R_0^c$, $R_H^c$, $R_V^c$ represent the red component of three candidate color values represented by the three selected candidate color codeword components and $\overline{R}^{xy}$ is the original red color of the image element in position (x,y) within the block. In the formula above, the color weights and original color is image element specific, whereas the candidate color values are the same, for a given selection of candidate codeword components, for all image elements in the block. The calculated error value is then stored in an error memory in step S12 together with a notification of the selected candidate color codewords.

The steps S10 to S12 are repeated for different selections of candidate color codeword components and if the estimated error value is smaller than the error value stored in the error memory, the new error value replaces the stored value and the candidate codeword components used for calculating this new smaller error value likewise replace the previously stored candidate codeword components.

This procedure is performed for all possible 18 bits for the red candidate components, resulting in $2^{18}$ steps. In addition, the procedure is performed for the green and blue color components, which in total involves $2^{18}+2^{19}+2^{18}$ operations. The respective red/green/blue codeword components resulting in the smallest error values are selected in step S13 and used as color codewords according to the present invention. The method then continues to step S4 of FIG. 1.

In another embodiment, a least square approach is taken instead of an exhaustive search. This can be represented in matrix form according to below:

$$\begin{bmatrix} \bar{R}^{00} \\ \bar{R}^{10} \\ \bar{R}^{33} \end{bmatrix} = \begin{bmatrix} w_0^{00} & w_H^{00} & w_V^{00} \\ w_0^{00} & w_H^{10} & w_V^{30} \\ w_0^{33} & w_H^{33} & w_V^{33} \end{bmatrix} \begin{bmatrix} R_0 \\ R_H \\ R_V \end{bmatrix}$$

This can also be written as $\bar{y}=A\bar{x}$, where $\bar{y}$ is a vector comprising the 16 original red components of the image elements in the block, A is a matrix comprising the 3×16=48 color weights assigned to the image elements and $\bar{x}$ is a vector comprising the red components to be determined and quantized into red components of the color codewords. Thus, the vector $\bar{x}$ should be determined. This can be done according to the equation below:

$$\bar{x}=(A^TA)^{-1}A^T\bar{y}$$

The same procedure is also performed for the green and blue color components.

It is anticipated by the present invention that other techniques besides exhaustive search and least square can be used to determine the at least two codewords per image block according to the present invention.

As has been discussed in the foregoing, the present invention is advantageously used as a complement or auxiliary mode to the iPACKMAN/ETC compression scheme. In such a case, the present invention will be used for compressing and decompressing image blocks having slowly varying color transitions and in particular when there is a color slope extending over several, neighboring blocks. For other image blocks, iPACKMAN/ETC may instead be used or another auxiliary mode.

FIG. 10 schematically illustrates such an implementation. The method continues from step S1 of FIG. 1. The provided image block to be compressed is then processed according to different schemes, typically in parallel. In other words, the image block is in step S20 compressed according to a first compression mode to generate a first compressed block representation. In a next step S24, an error value representative of representing the image block with this first compressed block is estimated. In addition, the same image block is further compressed according to at least one other compression mode, three other modes in the figure. Thus, a second, a third and a fourth compression mode is used for compressing the block in S21, S22 and S23 to generate a second, a third and a fourth compressed block representation, respectively. In steps S25, S26 and S27, error values representative of representing the block with the second, third or fourth compressed block representation are estimated. Now four or in alternative embodiments two, three or more than four) different compressed representation are available. In the next step S28, one of these four compressed representations is selected and used as compressed version of the current block. This selection step is performed based on the error values calculated in the steps S24-S27. Thus, the compressed representation associated with the smallest error value will be selected in step S28. In a next step S29, a mode index representative of the compression mode used for generating the selected compressed representation is provided and is included in the compressed image block, i.e. in the bit sequence representing the image block. This procedure is preferably performed for each image block to be compressed. The method then ends.

This means that each image block of an image is preferably analyzed and compressed individually, which in most typical applications (depending on the actual image to be encoded), results in a mosaic of image blocks compressed according to the different modes. Thus, a first set of the image blocks is compressed according to the first mode, a second set of the blocks is compressed according to the second mode, a third block set is compressed according to the third mode and a fourth block set is compressed according to the fourth mode. For other applications only one, two or three of the modes will be used for the different image blocks.

In this embodiment, a compressed candidate block is generated per available compression mode. However, in another embodiment, the selection of compression mode to use for a current is block is performed prior to the actual block compressions. In such a case, a first analyzing step is performed where the original colors of the image elements in the block and in particular their distribution in color space is investigated and analyzed. The selection of compression mode is performed based on this analysis.

This embodiment is possible since, as will be discussed further below, the different available compression modes are particularly suitable and effective for given block types. For example, the scheme of the present invention is effective in handling blocks with slowly varying, color transitions. The iPACKMAN/ETC scheme is very efficient for handling image blocks where the colors of the image elements have rather similar chrominance but varying luminance. A third possible scheme could be THUMB [8], which also can be used as auxiliary mode to iPACKMAN/ETC. This scheme has two modes or so-called patterns, which are adapted for managing image blocks having two distinct chrominances (colors).

This embodiment has the advantage that only one and not four compressed candidate blocks need to be generated, though at the cost of a block and color analysis and a risk of selecting a non-optimal compression scheme.

In FIG. 10, the first compression step S20 can represent the steps S2 to S4 of FIG. 1, i.e. assigning color weights, determining color codewords and representing the original colors of the image elements.

FIG. 11 is a flow diagram illustrating different embodiments of the other compression steps S21, S22 and S23 of FIG. 10 according to the iPACKMAN/ETC and THUMB schemes.

Starting with THUMP, the method continues from step S1 in FIG. 1. In a next step S30, a first and a second color codeword are determined. The first color codeword is a representation of a first color value and the second color codeword is likewise a representation of a second color value. The first and second color values are located on a first line in color space, preferably RGB space. This first line also has a first direction. In a next step S31, a color modifier codeword is provided. This modifier codeword is a representation of at least one color modifier applicable for modifying the first color value along a second line having a second direction in color space. By modifying the first color value with the at least one color modifier, multiple color representations are obtained along the second line. In this embodiment, the second direction is different from the first line, i.e. the first line and second line are not parallel.

A color index associated with a color representation selected, in step S32, from i) the multiple color representations along, the second line and ii) at least one color representation based on the second color value. This index selecting step is preferably performed for each image element in the block, which is schematically illustrated by the line L4.

The resulting compressed block representation of this mode will, thus, comprise the first and second color codewords, the color modifier codeword and a sequence of color indices.

The above-described THUMB scheme can actually, in turn, be run according to two modes or patterns, depending on how the colors of the image elements are distributed in color space. This means that THUMB occupies two of the four different modes in FIG. 10, FIGS. 12-14B disclose in more detail the usage of THUMB, in FIG. 12A the original (16) colors of image elements in a block to be compressed are depicted in color space, it is clear from the figure that the colors are positioned in two clusters 2, 4, each containing multiple colors. Such a color distribution is advantageously handled with the H-pattern/mode of THUMB, which is illustrated in FIG. 12B.

Figure 12A:
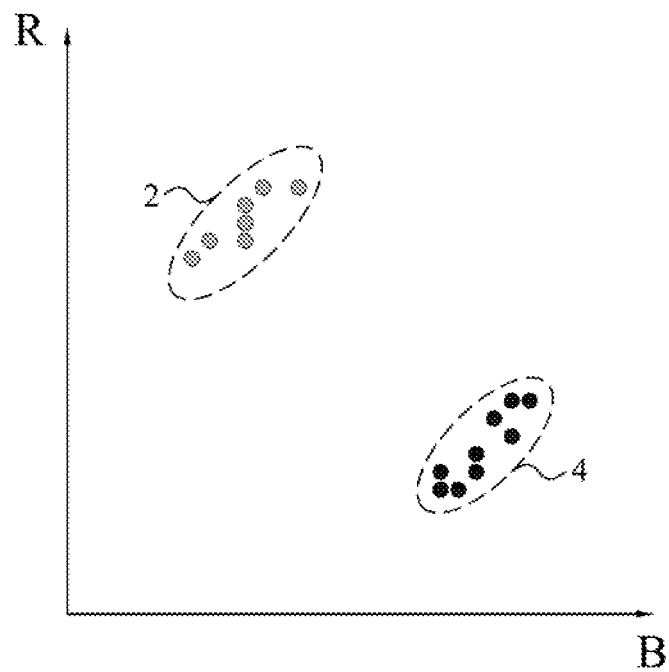
FIG. 12A is a diagram illustrating the distribution of colors of image elements of an image block that advantageously can be compressed according, to a mode of the multi-mode implementation.
Figure 12B:
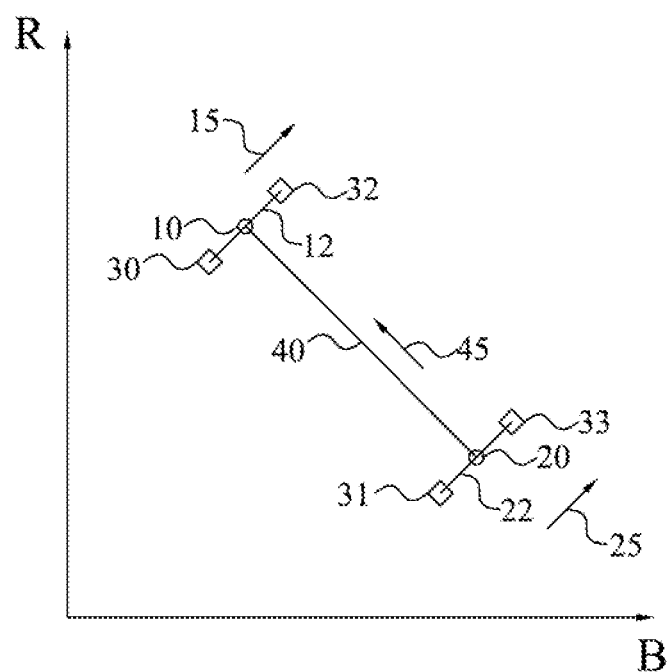
FIG. 12B is a diagram illustrating color representations generated according to a mode of the multi-mode implementation and suitable for representing the colors of the image elements illustrated in FIG. 12A.

In FIG. 12B, the first color value 10 represented by the first color codeword and the second color value 20 represented by the second color codeword are located on a first line 40 having a first direction 45. Two color representations 30, 32 are derivable from the first color value 10 using a color modifier represented by the color modifier codeword. These two color representations 30, 32 and the first color value 10 are positioned on a second line 12 having a second direction 15, which second direction 15 is different from the first direction 45. In this H-pattern/mode, a color modifier represented by the color modifier codeword is likewise used for modifying the second color value 20 to obtain two color representations 31, 33. These two color representations 31, 33 and the second color value 20 are positioned along a third line 22, having as third direction 25. In the illustrated example, the second 15 and third 25 directions are parallel.

The color indices selected for the image elements are then associated with one of the four color representations 30, 31, 32, 33.

Figure 13A:
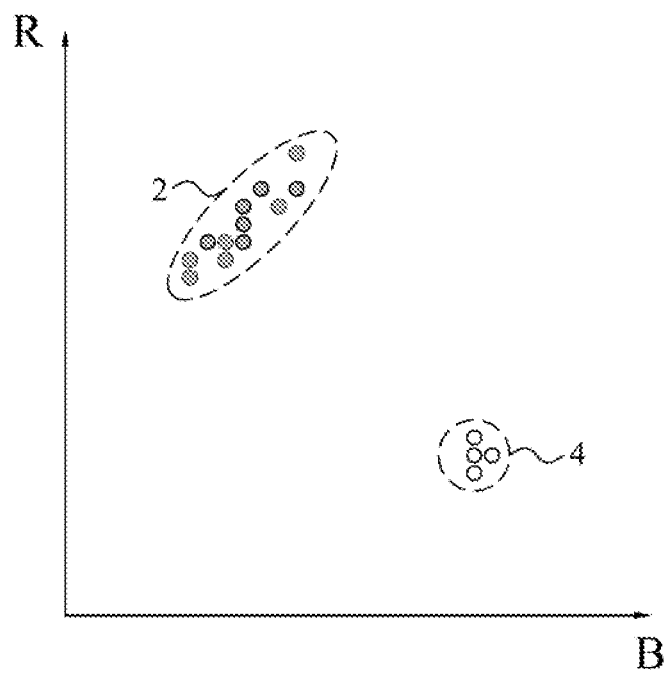
FIG. 13A is a diagram illustrating the distribution of colors of image elements of another image block that advantageously can be compressed according to another mode of the multi-mode implementation.

FIG. 13A is a corresponding diagram of an original color distribution effectively handled by a T-pattern/mode of THUMB. In the figure, the colors are positioned in two clusters 2, 4 similar to FIG. 12A. However, contrary to FIG. 12A, one of the clusters 4 has a general circular shape instead of elliptical.

Figure 13B:
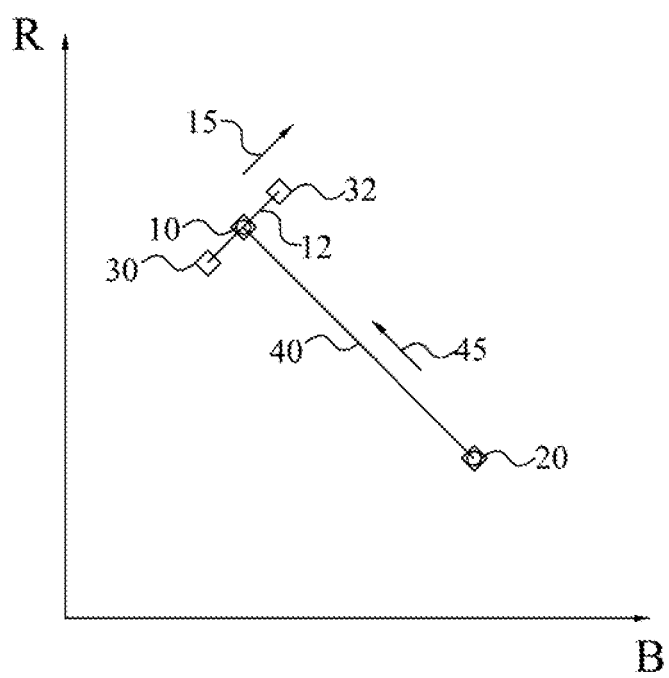
FIG. 13B is a diagram illustrating color representations generated according to another mode of the multi-mode implementation and suitable fir representing the colors of the image elements illustrated in FIG. 13A.

FIG. 13B illustrates how THUMB handles such a situation. The first 10 and second 20 color values are positioned on the first line 40 having the first direction 45. The first color value 10 is modified by a color modifier to generate a first 30 and a second 32 color representation positioned on the second line 12 having the second direction 15. In this pattern/mode, the color representations available for the image elements are the first 30 and second 32 color representation, the first color value 10 and the second color value 20. Each color index selected for the image elements is associated with one of these four possible representations.

If instead the iPACKMAN/ETC scheme is employed in step S22 of FIG. 10, a first color codeword is determined in step S30 as a representation of a first color value. In this step S30, a second color codeword is also determined. However, this second codeword is a representation of a differential color. A second color value is then obtainable as a sum of the first color value and the differential color image elements in a first sub-block (2×4 or 4×2 image elements) are assigned the first color value whereas image elements in a second sub-block (2>4 or 4×2 image elements) are assigned the second color value.

An intensity codeword is provided in step S31, where the intensity codeword is a representation of a set of multiple intensity modifiers. These intensity modifiers are applicable for modifying the intensity of the first or second color value to generate multiple color representations. In a preferred implementation, the intensity codeword is a table index to an intensity table comprising multiple modifier sets. Where the modifier sets have different intensity modifiers. In step S32, an intensity index is selected for each image element in the block, where the intensity index is associated with an intensity modifier from the intensity modifier set represented by the intensity codeword.

FIG. 14 schematically illustrates a possible compressed block representation 700 for the iPACKMAN/ETC differential mode. The compressed block 700 includes the first color codeword 710 including three color components, red 712, green 714 and blue 716, preferably each represented by five bits. The second color or differential color codeword 720 likewise includes three components, red 722, green 724 and blue 726, preferably each represented by three bits. The compressed block 700 further includes two intensity codewords 750A, 750B, one for each 2×4/4×2 sub-block, preferably each of 3 bits. A sequence 760 of intensity indices, preferably one 2-bit intensity index per image element in the block, is also included in the compressed block 700, resulting in 32 bits. A flipbit 770 defines whether the two sub-blocks of the image block is two 2×4 block or two 4×2 blocks, i.e. placed vertically flipbit=$0_{bin}$ or horizontally flipbit=$1_{bin}$. iPACKMAN/ETC comprises two so-called default modes, of which one has been described and disclosed in the present document. A diffbit 780 discriminates between these two default modes. In FIGS. 14 to 17, this diffbit 780 is equal and set to $1_{bin}$ (or $0_{bin}$). Note that the mutual order of the codewords 710, 720, 750A, 750B, index sequence 760, flipbit 770 and diffbit 780 of the encoded image block 700 may differ from what is illustrated in the figure. The total size of the compressed block is 64 bits.

In the iPACKMAN/ETC mode mentioned above, the color components 712, 714, 716 of the first color codeword 710 preferably each comprises 5 bits, basically representing any vale in the interval 0-31 ($00000_{bin}$-$11111_{bin}$). The components 722, 724, 726 of the second codeword 720 preferably each comprises 3 bits, which are used for representing a value in the interval −4 to +3. The color components of the second color value is obtainable by summing the components 712, 714, 716; 722, 724, 726 of the two codewords:

Red component=$R+dR$

Green component=$G+dG$

Blue component=$B+dB$.

Since these color components represent intensity information, they are allowed to assume the values from 0 (no intensity) to 31 (full intensity). This means that bit combinations of the first color codeword 710 and the second color codeword 720 that result in that the additions R+dR, G+dG, B+dB will overflow, i.e. be <0 or >31 will never be used by the encoder operating in this iPACKMAN/ETC mode. This allows for introducing three auxiliary modes that can be used to complement iPACKMAN/ETC.

In the first auxiliary mode, the red component overflows, i.e. R+dR is smaller than zero or larger than 31. This happens if the first three bits of the red component 712 of the first color codeword 710 are equal and different from the first bit of the red component 722 of the second color codeword 720.

In FIG. 15, this principle is employed for using the H-pattern/mode of THUMB as an auxiliary mode to iPACKMAN/ETC. Thus, in this mode four bits 790 cannot be selected freely since the red components must overflow, which happens if these four bits 790 are equal to $1110_{bin}$ or $0001_{bin}$. The compressed block representation 700 is preferably in total 64 bits, of which four has been used according to above. The remaining 60 bits are preferably divided between the including pans according to; 4 bits are assigned to each color component 712, 714, 716; 722, 724, 726 of the first 710 and second 720 color codewords. The color modifier codeword 750 comprises three bits, the diffbit 780 one bit (which has the same value as in FIG. 14) and the color index sequence 760 preferably 32 bits.

A second auxiliary mode is obtainable if the green component overflows, i.e. G+dG is smaller than zero or larger than 31 and the red component is not allowed to overflow, i.e. 0≤R+dR≤31. In this mode, the first bit of the red component 712 of the first color codeword in FIG. 14 is set different from the second or third bit of the red component 712. In addition, the first three bits of the green component 714 of the first color codeword 710 must be equal and different from the first bit of the green component 724 of the second color codeword 720.

In FIG. 16, bit0 (corresponds to first bit of red component in first color codeword in FIG. 14), bit8-bit10 (correspond to three first bits of green component in first color codeword in FIG. 14) and bit13 (corresponds to first bit of green component in second color codeword in FIG. 14), collectively represented by 790 in the figure, cannot be set freely. Therefore, 59 bits remain to use for the other parts of the compressed block 700. The division of bits among the color codewords 710, 720, color modifier codeword 750, diffbit 780 and color index sequence 760 is preferably the same as for FIG. 15 except that the color modifier codeword 750 in this case only comprises two bits instead of three.

A third auxiliary mode using the scheme of the present invention is available if the blue component overflows, i.e. B+dB is smaller than zero or larger than 31, but the red and green components are not allowed to overflow. This means that the first bit of the red 712 and green 714 component of the first color codeword 710 in FIG. 14 must differ from the second or third component in the red 712 and green 714 components. In addition, the blue component overflows, i.e. B+dB is smaller than zero or larger than 31.

In FIG. 17, therefore bit0 (corresponds to first bit of red component in first color codeword in FIG. 14), bit8 (corresponds to the first bit of green component in first color codeword in FIG. 14), bit16-bit18 (correspond to three first bits of blue component in first color codeword in FIG. 14) and bit21 (corresponds to first bit of blue component in second color codeword in FIG. 14), collectively denoted 790, cannot be set freely. The red 712, 722, 732 and blue 716, 726, 736 components of three color codewords 710, 720, 730 are preferably assigned 6 bits each, whereas the corresponding green components 714, 724, 734 comprise 7 bits each and the than 780 is one bit. This amounts, in total, to 64 bits.

If the four different compressed representations illustrated in FIGS. 14-17 are possible, a mode index used for discriminating between the four modes preferably includes defined positions in the bit sequences. These bit positions include the three first bits of the red, green and blue component of the first color codeword and the first bit of the red, green and blue component of the second color codeword in FIG. 14. In addition, the diffbit is preferably used to discriminate between the other available iPACKMAN/ETC mode. Note, however, that some of the hits of this mode index can be used for encoding the compressed block in the different modes.

Decompression

Figure 18:
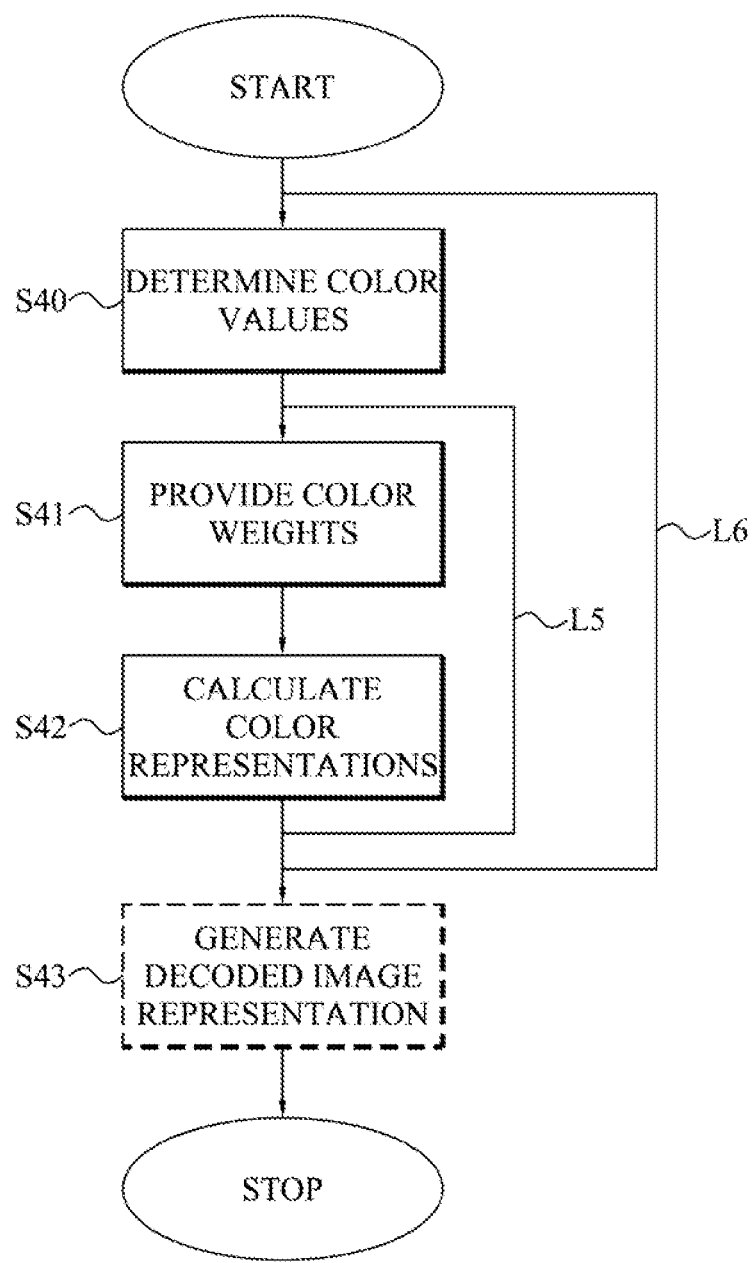
FIG. 18 is a flow diagram of a method of decoding/decompressing a compressed image and image block according to the present invention.

FIG. 18 illustrates a flow diagram of a method of decoding an encoded image or encoded version of an original image according to the present invention. The encoded image basically comprises several encoded representations of image blocks. These encoded block representations are preferably generated by the image encoding method discussed above.

The method generally starts by identifying encoded image block(s) to decode. It could be possible that all encoded image blocks of an encoded image should be decoded to generate decoded representation of the original image. Alternatively, only a portion of the original image is to be accessed. As a consequence, only a selected number of image blocks have to be decoded for more precisely, a selected amount of image elements of certain image blocks have to be decoded).

Once the correct encoded (representation(s) of) image block(s) is identified, step S40 determines at least two color values based on the at least two color codewords in the compressed block representations. In a preferred implementation, this determining step involves expanding the quantized color of the color codeword, such as RGB676, into, preferably, 24 bits (RGB888). If the second color codeword comprises differential color components, these components are preferably added to corresponding components of the first color codeword before expansion to generate a second color value. In a preferred implementation of the present invention, the compressed block representation comprises three color codewords. This means that three color values are determined in step S40 by extending each of the codeword.

The following to steps S41 and S42 are performed for each image element that is to be decoded, which is schematically illustrated by the line L5. In step S41, the color weights assigned to the image element to be decoded is provided. The color weights are preferably pre-defined weights, which depend on the actual position of the image element in the blocks:

$$w_0^{xy} = f_0(x,y)$$

$$w_H^{xy} = f_H(x,y)$$

$$w_V^{xy} = f_V(x,y)$$

Thus, all image blocks of the image compressed according to the present invention has preferably the same assignment of color weights so that an image element in, for example, position (2,1) in a first block will have the same color weights as an image element in position (2,1) in a second block.

However, it is anticipated by the present invention that there might be choice in the weight assignment that is performed block by block. In such a case, the compressed representation preferably comprises a weight codeword. This means that the weight provision in step S41 is then performed based on the weight codeword, i.e. the set of color weights used for the current block is identified based on the weight codeword.

In a next step S42, the color representation used for representing the original color of the image element to be decoded is calculated based on the provided color weights and the determined at least two color values. In a preferred implementation, the color representation is calculated as weighted, using the provided weights, (linear) combination of the determined color values. In this context, all the color values are preferably used in the calculation, but it could be possible to use only a subset thereof.

Steps S41 and S42 could be performed for several image elements in the image block (schematically illustrated by line L5). It is anticipated by the invention that in some applications, only a single image element is decoded from a specific image block, multiple image elements of a specific image block are decoded and/or all the image elements of a specific block are decoded.

Steps S40 to S42 are then preferably repeated for all image blocks that comprise image elements that should be decoded (schematically illustrated by line L6). This means that the loop of steps S40 to S42 could be performed once, but most often several times for different encoded image blocks and/or several times for a specific encoded image block.

In the optional step S43, a decoded representation of the original image, or a portion thereof, is generated based on the decoded image elements and blocks. The method then ends.

Figure 19:
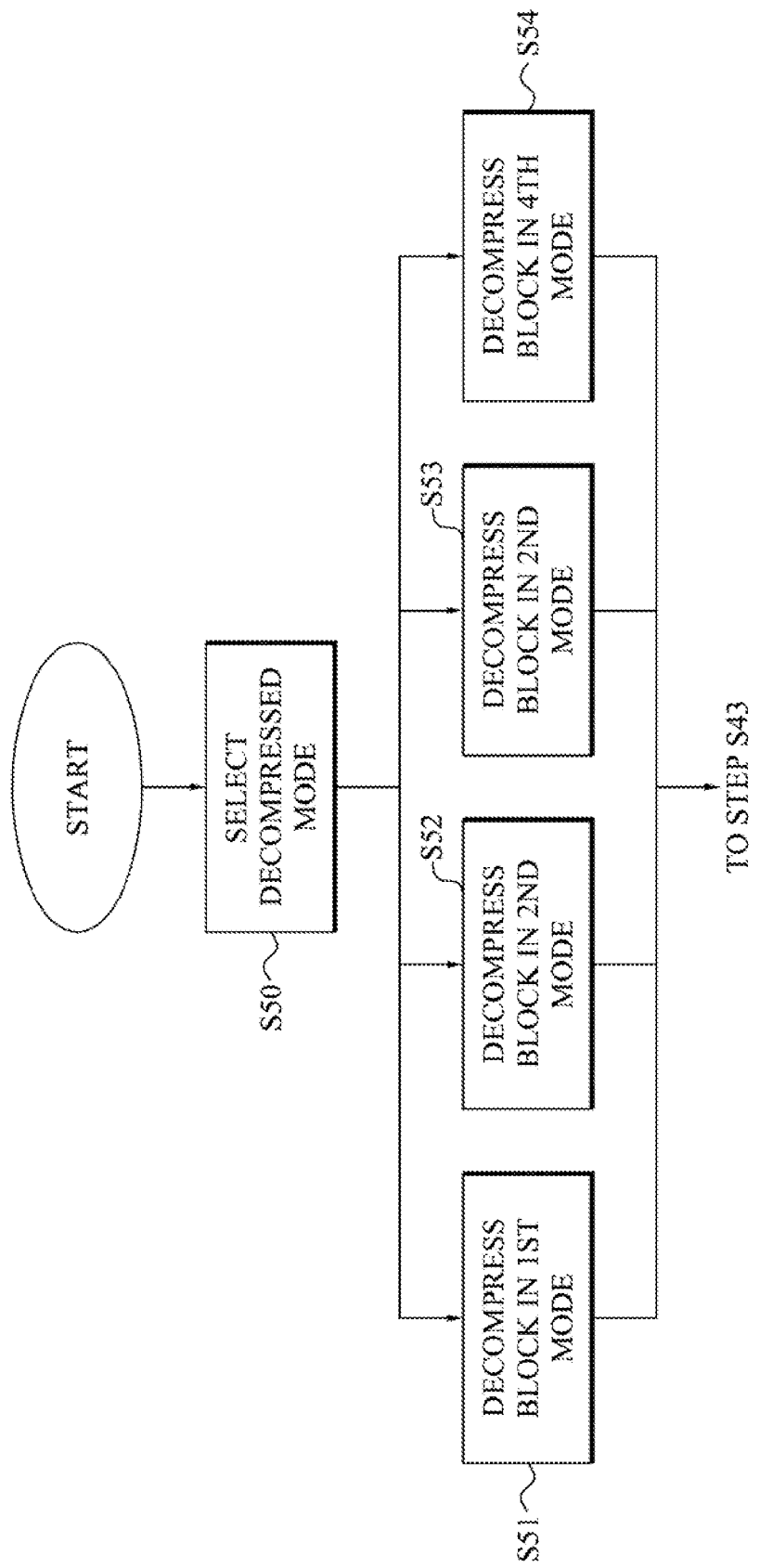
FIG. 19 is a flow diagram illustrating additional steps of the decoding/decompressing method of FIG. 20 for a multi-mode implementation.

FIG. 19 is a flow diagram of a multi-mode implementation of the image and block decoding/decompression of the present invention. The method starts in step S50, where a decompression mode to use for the current block is selected based on a mode index. If the four different compressed representations illustrated in FIGS. 14-17 are possible, the mode index includes the diffbit, the three first bits of the red, green and blue component of the first color codeword and the first bit of the red, green and blue component of the second color codeword in FIG. 14. Thus, the decoder investigates these bit positions in the bit sequence that constitutes the compressed block representation and selects which decompression mode based on the investigated bits. In a preferred implementation, a first compression mode is selected if the blue color component overflows but not the red and greens. A second and a third mode, is selected if the red component overflows or the green component overflows but not the red. If none of the components overflow, a fourth mode is selected in step S50.

If the first mode is selected in step S50, the method continues to step S51, where the block is decompressed according to this mode. This corresponds to performing the steps S40-S42 illustrated in FIG. 18. If a second, third or fourth mode is instead selected, the method continues to step S52, S53 or S54.

FIG. 20 illustrates the decompression performed according to the THUMB mode. Starting in step S60, a first color value is determined based on the first color codeword. A second color value is determined based on the second color codeword in the step S61. These two color values are located on a first line having a first direction in color space (see FIGS. 12B and 13B). The color determinations of steps S60 and S61 preferably involve expanding the bit sequence of the codewords to generate the color values. A next step S62 generates multiple color representations along a second line having a second direction in color space by modifying the first color value with at least one color modifier represented by the color modifier codeword. This second direction is different from the first direction. The next step S63 is performed per image element to be decoded, which is schematically illustrated by the line L7. This step S63 involves selecting, based on the color index sequence and more precisely the color index assigned to the relevant image element, a color representation from i) the multiple color representations along the second line and ii) at least one color representation bases on the second color value. In the H-pattern/mode, at least one color modifier provided based on the modifier codeword is also used for modifying the second color value along a third line having a third direction (different from the first direction) to generate multiple color representations. Thus, two sets of multiple color representations (one located on the second line and the other located on the third line) are available in this H-pattern and the color index of the image elements points to one of the representations in the two sets. In the T-pattern/mode, the multiple color representations on the second line are complemented with the first and second color value that can also be selected as color representations for the image elements. The method then continues to step S43 of FIG. 18.

If instead the iPACKMAN/ETC mode is selected based on the mode index, a color value is determined based on the first color codeword or the first and second color codeword in step S70 of FIG. 21. The color value is, if the image element to be decoded is present in a first (2×4/4×2) sub-block, determined based on the first color codeword, preferably by expanding the bit sequence of the codeword from RGB555 into RGB888. If the image element is instead is present in a second (2×4/4×2) sub-block, the color value is determined based on both the first and second color codeword, basically by adding the red components, green components and blue components of the first and second codewords and then expanding the result into RGB888 or alternatively first expanding the codeword components and then adding them). The compressed block comprises, in this mode, two intensity codewords, one per sub-block. The intensity codeword assigned to the sub-block comprising the image element to be decoded is used in step S71 to provide a set of multiple intensity modifiers. This step preferably comprises providing, based on the intensity codeword, the modifier set from a table comprising multiple such modifier sets. An intensity modifier to use for the image element is selected in step S72 from the provided modifier set based on the intensity index assigned to the image element. In the next step S73, the determined color value is intensity modified by the selected modifier to generate a color representation for the image element. The steps S70 to S73 are preferably repeated for all image elements in the block that are to be decoded. The method then continues to step S43 of FIG. 18.

Decompression Examples

Herein follows decompression examples using a bit sequence layout as illustrated in FIGS. 14 to 17.
iPACKMAN/ETC The compressed image block is represented by the following bit sequence:
10110 010 11010 110 00100 000 101 110 1 1
10 01 11 00 01 01 10 11 10 00 11 00 01 01 00 01

Firstly, bit0-bit2, bit6, bit8-10, bit13, bit16-18, bit21 and the diffbit 780 are investigate to determine which decompression mode to use for this image block. Since none of the color components overflow and the diffbit 780 is set to 1, the differential default mode of iPACKMAN/ETC should be selected.

Firstly, the color components 712, 714, 716 of the first color codeword 710 are expanded into RGB888 to generate the first color value:

Red: $10110_{bin} \Rightarrow 101101_{bin} = 181$.

Green: $11010_{bin} \Rightarrow 11010110_{bin} = 214$

Blue: $00100_{bin} \Rightarrow 00100001_{bin} = 33$

The differential components 722, 724, 726 of the second color codeword 720 are added to these components to obtain the second color value:

Red: $010_{bin} \leftrightarrow 2 \Rightarrow 181+2=183$

Green: $110_{bin} \leftrightarrow 2 \Rightarrow 214-2=212$

Blue: $000_{bin} \leftrightarrow 0 \Rightarrow 33+2=33$

The flipbit is set to $1_{bin}$, which implies that the first color value is assigned to the eight image elements in the two uppermost rows of the 4×4 block, whereas the second color value is used for the eight image elements in the two lowest rows.

The two intensity codewords 750A, 750B point an intensity table, exemplified by Table 8 below:

TABLE 8 intensity table

| intensity codeword | $11_{bin}$ | $10_{bin}$ | $00_{bin}$ | $01_{bin}$ |
|---|---|---|---|---|
| $000_{bin}$ | −8 | −2 | 2 | 8 |
| $001_{bin}$ | −12 | −4 | 4 | 12 |
| $010_{bin}$ | −31 | −6 | 6 | 31 |
| $011_{bin}$ | −34 | −12 | 12 | 34 |
| $100_{bin}$ | −50 | −8 | 8 | 50 |
| $101_{bin}$ | −57 | −19 | 19 | 57 |
| $110_{bin}$ | −80 | −28 | 28 | 80 |
| $111_{bin}$ | −127 | −42 | 42 | 127 |

The first intensity codeword 750A applicable for image elements in the first 2×4 sub-block is $101_{bin}$, representing the intensity modifiers −57, −19, 19, 57. The second intensity codeword 750B instead represents the intensity modifiers −80, −28, 28, 80.

The first image element in position (0,0) will have the following color representation:

(181,214,33)+(−19,−19,−19)=(162,195,14)

Correspondingly, the color representation of the last image element (in position (3,3)) is calculated as follows:

(183,212,33)+(80,80,80)=(255,255,113)

after clamping the calculated color component values between the minimum allowed value of 0 and the maximum value of 255.

This procedure is then continues for the rest of the image elements in the image blocks.

H-Pattern of THUMB

The compressed image block is represented by the follow bit sequence:
111 10 0 10 1101 0110 0010 0000 1011 101 1
10 01 11 00 01 01 10 11 10 00 11 00 01 01 00 01

In this case, the bits bit0-bit2 are all equal and different from bit5, which means that the rod component overflows and a first auxiliary mode, i.e. THUMB H-pattern, should be used. The bit sequence presented above has the layout as illustrated in FIG. 15.

The first and second color values are generated by expanding the components 712, 714, 716; 722, 724, 726 of the two color codewords 710, 720:

Red 0: $1010_{bin} \Rightarrow 101010_{bin} = 170$

Green 0: $1101_{bin} \Rightarrow 11011101_{bin} = 221$

Blue 0: $0110_{bin} \Rightarrow 01100110_{bin} = 102$

Red 1: $0010_{bin} \Rightarrow 00100010_{bin} = 34$

Green 1: $0000_{bin} \Rightarrow 00000000_{bin} = 0$

Blue 1: $1011_{bin} \Rightarrow 10111011_{bin} = 187$

The first color value is, thus, (170, 221, 102) and the second value is (34, 0, 187).

The modifier codeword 750 $101_{bin}=5$ implies that the number $1_{bin}$ should be shifted five times leftwards to obtain $100000_{bin}32$. This value is used to modify the two color values to obtain four color representations:

C0: (170,221,102)−(32,32,32)=(138,189,70)

C1: (170,221,102)+(32,32,32)=(202,253,134)

C2: (34,0,187)−(32,32,32)=(2,0,155)

C3: (34,0,187)+(32,32,32)=(66,32,219)

The first image element: has color index $10_{bin}$, which implies that color representation C2 is used for this image element. This procedure is continued for the rest: of image elements (index $00_{bin} \leftrightarrow C0$, $01_{bin} \leftrightarrow C2$, $10_{bin} \leftrightarrow C2$ and $11_{bin} \leftrightarrow C3$).

T-Pattern THUMB

The compressed image block is represented by the ming bit sequence:
1 0110 010 000 1 0 1 100 0100 0001 0111 01 1
10 01 11 00 01 01 10 11 10 00 11 00 11 01 00 01

In this case, the green component overflows since bit8-bit10 are equal and different from bit12. In addition, the red component does not overflow since bit0 is different from bit1. This means that a second auxiliary decompression triode in the form of T-pattern of THUMB should be selected and the bit sequence is interpreted as having the layout of FIG. 16.

The two color values are calculated in the same way as above for the P-pattern.

Red 0: $0110_{bin} \Rightarrow 01100110_{bin} = 102$

Green 0: $0101_{bin} \Rightarrow 01010101_{bin} = 85$

Blue 0: $0100_{bin} \Rightarrow 01000100_{bin} = 68$

Red 1: $0100_{bin} \Rightarrow 01000100_{bin} = 68$

Green 1: $0001_{bin} \Rightarrow 00010001_{bin} = 17$

Blue 1: $0111_{bin} \Rightarrow 01110111_{bin} = 119$

In this case the color modifier 750 includes only two bits $01_{bin}=1$, which implies that the number $1_{bin}$ should be shifted leftward one: step to obtain $10_{bin}=2$. Two of the four possible color representations are calculated using this modifier value, whereas the other two representations are equal to the two color values:

C0: (102,85,68)

C1: (102,85,68)−(2,2,2)=(100,83,66)

C2: (102,85,68)+(2,2,2)=(104,87,70)

C3: (68,17,119)

The first image element has color index $10_{bin}$, which corresponds to C2. The procedure is then repeated for the rest of the image elements in the block.

PLANAR

The compressed image block is represented by the following bit sequence:
1 011001 0 0 101011 0 000 00 1 010 111001 1
1001110 001011 011100 0110001 010001

In this example, the blue component overflows since bit16-bit18 are equal and different from bit21. In addition, bit0 is different from bit1 (red does not overflow) and bit8 is different from bit9 (green does not overflow). As a consequence, a fourth decompression mode as defined in the present invention, PLANAR, should be used.

In this example, three color values are calculated by expanding the color components 712, 714, 716; 722, 724, 726; 732, 734, 736 of the three color codewords 710, 720, 730 into RGB888.

$R_O$: $011001_{bin} \Rightarrow 1100101_{bin} = 101$ $G_O$: $0101011_{bin} \Rightarrow 01010110_{bin} = 86$ $B_0$: $000010_{bin} \Rightarrow 000010000_{bin}=8$ $R_H$: $111001_{bin} \Rightarrow 11100111_{bin}=231$ $G_H$: $1001110_{bin} \Rightarrow 10011101_{bin}=157$ $B_H$: $001011_{bin} \Rightarrow 00101100_{bin}=44$ $R_V$: $011100_{bin} \Rightarrow 01110001_{bin}=113$ $G_V$: $0110001_{bin} \Rightarrow 01100010_{bin}=98$ $B_V$: $010001_{bin} \Rightarrow 01000101_{bin}=69$ These color values are then weighted and combined according to the teachings of Table 6 above. The color representation for the first image element (0,0) is simply the first value (101, 6, 8). The color representation for image element (1,0) is three fourths thirds of the first color value and one fourth of the second color value, i.e.

$$\frac{3}{4}(101, 86, 8) + \frac{1}{4}(231, 157, 44) = (133, 104, 17).$$

This procedure is continued for the rest of the image elements to provide a decoded representation of the image block.

Implementation Aspects

The image encoding (image block encoding) and image decoding (image block decoding or processing scheme according to the present invention could be provided in a general data processing system, e.g. in a user terminal or other unit configured for processing and/or rendering images. Such a terminal could be a computer, e.g. PC, a game console or a thin client, such as a Personal Digital Assistance (PDA), mobile unit and telephone.

User Terminal

FIG. 22 illustrates a user terminal 100 represented by a mobile unit. However, the invention is not limited to mobile units by could be implemented in other terminals and data processing units, such as PC computers and game consoles. Only means and elements in the mobile unit 100 directly involved in the present invention are illustrated in the figure.

The mobile unit 1110 comprises a (central) processing unit (CPU) 200 for processing data, including image data, within the mobile unit 100. A graphic system 130 is provided in the mobile unit 100 for managing image and graphic data. In particular, the graphic system 130 is adapted for rendering or displaying images on a connected screen 120 or other display unit. The mobile unit 100 also comprises a storage or memory 140 for storing data therein. In this memory 140 image data may be stored, in particular encoded image data (encoded image blocks) according to the present invention.

An image encoder 210 according to the present invention is provided in the mobile unit 100. This encoder 210 is configured for encoding an image or texture into an encoded representation of the image (or texture). As was discussed above, such an encoded representation comprises a sequence or file of multiple encoded image blocks. This image encoder 210 may be provided as software running on the CPU 200, as is illustrated in the figure. Alternatively, or in addition, the encoder 210 could be arranged in the graphic system 130 or elsewhere in the mobile unit 100.

An encoded representation of an image from the block encoder 210 may be provided to the memory 140 over a (memory) bus 150, for storage therein until a subsequent rendering of the image. Alternatively, or in addition, the encoded image data may be forwarded to an input and output (I/O) unit 110 for (wireless or wired) transmission to other external terminals or units. This I/O unit 110 can also be adapted for receiving image data from an external unit. This image data could be an image that should be encoded by the image encoder 210 or encoded image data that should be decoded. It could also be possible to store the encoded image representation in a dedicated texture memory provided, for example, in the graphic system 130. Furthermore, portions of the encoded image could also, or alternatively, be (temporarily) stored in a texture cache memory, e.g. in the graphic system 130.

An image decoder 220 according, to the present invention is provided in the mobile unit 100 for decoding an encoded image in order to generate a decoded image representation. This decoded representation could correspond to the whole original image or a portion thereof. The image decoder 220 provides decoded image data to the graphic system 130, which in turn typically processes the data before it is rendered or presented on the screen 120. The image decoder 220 can be arranged in the graphic system 130, as is illustrated in the figure. Alternatively, or in addition, the decoder 200 can be provided as software running on the CPU 200 or elsewhere in the mobile unit 100.

The mobile unit 100 could be equipped with both an image encoder 210 and an image decoder 220, as is illustrated in the figure. However, for some terminals 100 it could be possible to only include an image encoder 210. In such a case, encoded image data could be transmitted to another terminal that performs the decoding and, possibly, rendering of the image. Correspondingly, a terminal 100 could only include an image decoder 220, i.e. no encoder. Such a terminal 100 then receives a signal comprising encoded image data from another terminal and decodes it to generate a decoded image representation. Thus, the encoded image signal could be wirelessly be transmitted between terminals using radio transmitter and receiver. Alternatively, other techniques for distributing images and encoded image representations between terminals according to the invention could be employed, such as Bluetooth®, IR-techniques using IR ports and wired transferring of image data between terminals. Also memory cards or chips that can be connected and exchanged between terminals could be used for this image data inter-terminal distribution.

The units 110, 130, 200, 210 and 220 of the mobile unit 100 may be provided as software, hardware or a combination thereof.

Image Encoder

FIG. 23 illustrates a block diagram of an embodiment of an image encoder 210 according to the present invention. The encoder 210 typically comprises an image decomposer 215 for decomposing or dividing an input image into several image blocks. The decomposer 215 is preferably configured for decomposing the image into image blocks comprising sixteen image elements (pixels, texels or voxels), i.e. having a general size of 4×4 image elements. This decomposer 215 could be adapted for decomposing different input images into image blocks with different sizes. In such a case, the decomposer 215 preferably receives input information, enabling identification of which image block format to use for a given image.

This embodiment of the image encoder 210 comprises a single block encoder 300. This block encoder 300 encodes the image block(s) received from the image decomposer to generate encoded block representation(s). The overall sin of the block representation is smaller than the corresponding site of the uncoded image block. The block encoder 300 is preferably configured for processing (encoding) each image block from the decomposer 215 sequentially.

In an alternative implementation, the encoder 210 includes multiple block encoders 300 for processing multiple image blocks from the image decomposer 215 in parallel, which reduces the total image encoding time.

The units 215 and 300 of the image encoder 210 may be provided as software, hardware or a combination thereof. The units 215 and 300 may be implemented together in the image encoder 210. Alternatively, a distributed implementation is also possible with some of the units provided elsewhere in the mobile unit.

Block Encoder

FIG. 24 illustrates a block diagram of an embodiment of a block encoder 300 according to the present invention, such as the block encoder of the image encoder in FIG. 23. The encoder 300 comprises a weight assigner 310 for assigning color weights to at least one subset of the image elements in an image block that is to be compressed. In a preferred implementation, the weight assigner 310 assigns Z color weight per image element in the block, where Z is a multiple number which is equal to the number of color codewords a color quantizer 320 determines for the image block. In another preferred embodiment, the assigner 310 assigns color weights to the image elements in a block so that color component values of at least one color component of color representations used for representing the original colors of the image elements change monotonically along a row or/and column of image elements in the block. The weight assignment performed by the assigner 310 of the block encoder 300 to image elements in a block is preferably conducted based on the position of the image elements, i.e. the relative coordinates of the image elements in the block.

The color quantizer 320 of the block encoder 300 is arranged for determining, based at least partly on the color weights assigned by the assigner 310, at least two color codewords for the image block. In a preferred implementation, the color quantizer 320 determines three color codewords, preferably three RGB676 codewords.

The units 310 and 320 of the block encoder 300 may be provided as software, hardware or a combination thereof. The units 310 and 320 may be implemented together in the block encoder 300. Alternatively, a distributed implementation is also possible with some of the units provided elsewhere in the image encoder.

FIG. 25 is a schematic block diagram of another embodiment of a block encoder 300 according to the present invention. This block encoder 300 is adapted for operating according to different compression modes, preferably four different modes. In a first compression mode, the weight assigner 310 and color quantizer 320 are operated according to the discussion above in connection with FIG. 24. This, thus, results in a compressed image block comprising three color codewords and a mode index, which is to be described thither below. An example of such a compressed block is illustrated in FIG. 17.

In the iPACKMAN/ETC compression mode, the color quantizer 320 is operated for determining a first color codeword that is a representation of a first color value and for determining a second color codeword as a representation of a differential color, which can be added to the first color value to obtain a second color value. A modifier quantizer 340 is operated in this mode for determining at least one, preferably two, intensity codewords as representation of at least one set of multiple intensity modifiers used for modifying the first or second color value to obtain color representations. The intensity codewords are preferably table indices to a modifier table 500 comprising multiple such modifier sets. An index selector 350 is provided in the block encoder 300 for determining, for each image element in the block, an intensity index associated with one of the intensity modifiers in the modifier set(s) represented by the intensity codeword(s).

In the two THUMB modes, the color quantizer 320 determines a first color codeword as a representation of a first color value. In addition, the quantizer 320 determines a second codeword as representation of a second color value, where these two values are located on a first line with a first direction in color space. The modifier quantizer 340 is operated in this mode for providing a color modifier codeword as a representation of at least one color modifier applicable for modifying the first color value along a second line having a second direction in color space. This color modification results in multiple color representations along the second line. The second and first directions are non-parallel. The index selector 350 then selects, for each image element, a color index associated with a color representation selected from i) the color representations along the second line and ii) at least one color representation based on the second color value.

In a preferred implementation, multiple compressed candidate representations are determined for a given image block, one representation per compression mode. A mode selector 360 is then implemented for selecting which of the candidate representations that should be used as compressed representation for the image block. This selection is preferably performed based on a comparison of error estimates, one such estimate per compression mode. The candidate that is leads to a smallest error is preferably selected by the mode selector 360. A mode index manager 370 then compiles a mode index representative of the compression mode resulting in the smallest error, i.e. the mode used when generating the candidate selected by the mode selector 360. This mode index, constitutes a part of the compressed image block.

The units 310 to 370 of the block encoder 300 may be provided as software, hardware or a combination thereof. The units 310 to 370 and 500 may be implemented together in the block encoder 300. Alternatively, a distributed implementation is also possible with some of the units provided elsewhere in the image encoder.

Image Decoder

FIG. 26 illustrates a block diagram of an embodiment of an image decoder 220 according to the present invention. The image decoder 220 preferably comprises a block selector 222 that is adapted for selecting, e.g. from a memory, which encoded image block(s) that should be provided to a block decoder 400 for decoding. The block selector 222 preferably receives input information associated with the encoded image data, e.g. from a header or a rendering engine. An address of an encoded image block having, the desired image element(s) is then computed based on the input information. This computed address is preferably dependent upon the image-element (pixel, texel or voxel) coordinates within an image. Using the address, the block selector 222 identifies the encoded image block from the memory. This identified encoded image block is then fetched from the storage and provided to the block decoder 400.

The (random) access to image elements of an image block advantageously enables selective decoding of only those portions of an image that are needed. Furthermore, the image can be decoded in any order the data is required. For example, in texture mapping only portions of the texture may be required and these portions will generally be required in a non-sequential order. Thus, the image decoding of the present invention can with advantage by applied, to process only a portion or section of an image.

The selected encoded image block is then forwarded to the block decoder 400. In addition to the image block, the decoder 400 preferably receives information specifying which image elements of the block that should be decoded. The information could specify that the whole image block, i.e. all image elements therein, should be decoded. However, the received information could identify only a single or a few of the image elements that should be decoded. The block decoder 400 then generates a decoded representation of the image element(s) in the block. This decoded representation is preferably a P-bit color, where P is the number of bits per image element in the original image, e.g. a 24-bit RGB color.

An optional image composer 224 could be provided in the image decoder 220. This composer receives the decoded image elements from the block decoder 400 and composes them to generate a pixel that can be rendered or displayed on a screen. This image composer 224 could alternatively be provided in the graphic system.

Alternatively, the image decoder 220 comprises multiple block decoders 400. By having access to multiple block decoders 400, the image decoder 220 can process (decode) multiple encoded image blocks in parallel. These multiple block decoders 400 allow for parallel processing that increases the processing performance and efficiency of the image decoder 220.

The units 222, 224 and 400 of the image decoder 220 may be provided as software, hardware or a combination thereof. The units 222, 224 and 400 may be implemented together in the image decoder 220. Alternatively, a distributed implementation is also possible with some of the units provided elsewhere in the user terminal.

Block Decoder

FIG. 27 is an illustration of an embodiment of a block decoder 400 according to the present invention. The block decoder 400 comprises as color generator 410 that generates at least two color values based on the at least two color codewords in the compressed block representation. This color generator 410 is preferably configured for expanding, or extending the quantized color components of the color codewords into, preferably, RGB888. A weight manager 420 is arranged in the block decoder 400 for providing, for each image element that should be decoded, color weights assigned to the image element(s). In a preferred implementation, corresponding image elements in a given position in different image blocks have same assigned color weights. Thus, the color weights are dependent on the coordinates or positions of the image elements in the block but do not change for different blocks compressed according to the present invention. The weight manager 420 therefore preferably provides color weights based on image elements positions/coordinates in the image block.

A color calculator 430 is connected to the color generator 410 and the weight manager 420 and uses the provided color weights and the generated color values for determining a color representation to use as a representation of the original color of the image element. The calculator 430 is preferably implemented for combining the color values from the generator 410 but weighted with the color weights from the weight manager 420.

The units 410 to 430 of the block decoder 400 may be provided as software, hardware or a combination thereof. The units 410 to 430 may be implemented together in the block decoder 400. Alternatively, a distributed implementation is also possible with some of the units provided elsewhere in the image decoder.

FIG. 28 is a schematic block diagram of another embodiment of a block decoder 400 according to the present invention adapted for multi-mode operation. The block decoder 400 comprises a mode selector 460 that selects which decompression mode out of multiple available modes, preferably four modes, to use when decompressing the current compressed block representation. This mode selector 460 uses a mode index in the compressed block for selecting the correct mode.

If the selector 460 selects a first decompression mode, the color generator 410, weight manager 420 and color calculator 430 are operated as described in the foregoing in connection with FIG. 27.

If the selector 460 instead selects a second decompression mode, corresponding to iPACKMAN/ETC, the color generator 410 determines a color value based on the first color codeword or based on the first and second color codeword (depending on the actual position of the image element in the block). In the former case, the quantizer component colors are simply extended into preferably RGB888. In the latter case, the differential components of the second codeword are added to the color components derivable from the first codeword to determine the color value. A modifier manager 470 is provided in the block decoder 400 for providing, based on one of the at least one intensity codewords, a set of multiple intensity modifiers, preferably from a modifier table 500. A color selector 450 selects, using an intensity index associated with the current image element, one of the intensity modifiers from the provided set. A color modifier 440 then uses this selected intensity modifier to intensity modify the color value to calculate a color representation for the image element.

If the THUMB modes are selected by the mode selector 460, the color generator 410 determines a first color value using the first color codeword and determines a second color value based on the second color codeword. The two values are located on a first line having a first direction in color space. The color modifier 440 generates multiple color representations along a second line having a second different direction by modifying the first color value with at least one color modifier represented by the color modifier codeword. The color selector 450 then selects, based on the color index sequence, a color representation from i) the multiple color representations along the second line and ii) at least one color representation based on the second color value.

The units 410 to 470 of the block decoder 400 may be provided as software, hardware or a combination thereof. The units 410 to 470 and 500 may be implemented together in the block decoder 400. Alternatively, a distributed implementation is also possible with some of the units provided elsewhere in the image decoder.

It will be understood by a person skilled in the art that various modifications and changes may be made to the present invention without departure from the scope thereof, which is defined by the appended claims.

REFERENCES

[1] Delp, Mitchell: Image Compression using Block Truncation Coding. *IEEE Transactions on Communications* 2, 9 (1979), 1335-1342
[2] Campbell, Defant, Frederiksen, Joyce, Leske, Lindberg, Sandia: Two Bit/Pixel Full Color Encoding. *In Proceeding of SIGGRAPH* (1986), vol. 22, pp. 215-223
[3] U.S. Pat. No. 5,956,431
[4] S. Fenney, "Texture compression using low-frequency signal modulation", *Graphics Hardware* 2003, pp. 84-91, July 2003
[5] International application WO 2005/059836
[6] International application WO 2006/006915

[7] Ström, Akenine-Möller: iPACKMAN high-quality, low complexity texture compression for mobile phones, *Graphics Hardware* 05, Los Angeles, USA, June 2005

[8] Ström, Pettersson: "Texture compression: THUMB—Two Hues Using Modified Brightness", *SIGRAD* '05, Lund, Sweden, November 2005

The invention claimed is:

1. A method of processing a compressed representation of an image block comprising multiple image elements, said compressed representation comprising at least two color codewords, and said method in a system comprising the steps of:
   determining, by the system, at least two color values based on said at least two color codewords, wherein said color codewords are quantized color values;
   for at least one image element in said image block:
      providing, by the system, color weights assigned to said at least one image element based on a position of said image element within said image block; and
      calculating, by the system, a color representation based on said provided color weights and said determined at least two color values.

2. The method according to claim 1, wherein said providing step comprises providing said color weights based only on a position of said image element within said image block.

3. The method according to claim 1, wherein said providing step comprises providing color weights defined in such a way that color component values of at least one color component of color representations change monotonically along a row or column of image elements in said image block.

4. The method according to claim 1, wherein said compressed representation comprises three color codewords and said determining step comprises determining three color values based on three color codewords, and said calculating step comprises calculating said color representation based on said provided color weights and at least two color values of said determined three color values.

5. The method according claim 1, further comprising the steps of:
   selecting, by the system, a decompression mode based on a mode index in said compressed block representation; and
   decompressing, by the system, said compressed representation according to said selected decompression mode, wherein said decompressing step comprises said determining, providing and calculating steps if a first decompression mode is selected based on said mode index.

6. A method of decoding an encoded image that comprises encoded representations of image blocks, each image block comprising multiple image elements, said method in a system comprising the steps of:
   processing, by the system, compressed representations of image blocks to generate multiple color representations of image elements, wherein each compressed representation comprising at least two color codewords, and wherein the processing of each compressed representation of an image block comprises:
      determining at least two color values based on at the least two color codewords, wherein said color codewords are quantized color values;
      for at least one image element in said image block:
         providing color weights assigned to said at least one image element based on a position of said image element within said image block; and
         calculating a color representation based on said provided color weights and said determined at least two color values; and
   generating, by the system, a decoded representation of said encoded image by composing said multiple color representations of image elements.

7. A system for processing a compressed representation of an image block comprising multiple image elements, said compressed representation comprising at least two color codewords, and said system comprising:
   a color generator for determining at least two color values based on said at least two color codewords, wherein said color codewords are quantized color values;
   a weight manager for providing, for at least one image element in said image block, color weights assigned to said at least one image element, wherein said weight manager is arranged for providing said color weights based on a position of said at least one image element within said image block; and
   a color calculator for calculating a color representation based on said provided color weights and said determined at least two color values.

8. The system according to claim 7, wherein said weight manager is arranged for providing said color weights based only on a position of said at least one image element within said image block.

9. The system according to claim 7, wherein said compressed representation comprises three color codewords and said color generator is arranged for determining three color values based on three color codewords, and said color calculator is arranged for calculating said color representation based on said provided color weights and at least two color values of said determined three color values.

10. The system according claim 7, further comprising a mode selector for selecting a decompression mode based on a mode index in said compressed representation, said color generator, weight manager and color calculator are operated in a first decompression mode.

11. The system according to claim 7, wherein the system comprises a user terminal.

12. A system for decoding an encoded image that comprises encoded representations of image blocks, each image block comprising multiple image elements, said system comprising:
   a processing system for processing compressed representations of image blocks to a generate multiple color representations of image elements, wherein each compressed representation comprising at least two color codewords, and wherein the processing system processes each compressed representation of an image block utilizing:
      a color generator for determining at least two color values based on said at least two color codewords, wherein said color codewords are quantized color values;
      a weight manager for providing, for at least one image element in said image block, color weights assigned to said at least one image element, wherein said weight manager is arranged for providing said color weights based on a position of said at least one image element within said image block; and
      a color calculator for calculating a color representation based on said provided color weights and said determined at least two color values; and
   an image composer for generating a decoded representation of said encoded image by composing said multiple color representations of image elements.

* * * * *

UNITED STATES PATENT AND TRADEMARK OFFICE
CERTIFICATE OF CORRECTION

| | | |
|---|---|---|
| PATENT NO. | : 9,087,365 B2 | |
| APPLICATION NO. | : 13/826578 | |
| DATED | : July 21, 2015 | |
| INVENTOR(S) | : Ström | |

It is certified that error appears in the above-identified patent and that said Letters Patent is hereby corrected as shown below:

In the Drawings

In Fig. 11, Sheet 6 of 15, delete "STEP S25, S27 OR S27" and insert -- STEP S25, S26 OR S27 --, therefor.

In Fig. 19, Sheet 11 of 15, for Step "S53", in Line 2, delete "BLOCK IN 2ND" and insert -- BLOCK IN 3RD --, therefor.

In the Specification

In Column 1, Line 38, delete "sorting," and insert -- sorting --, therefor.

In Column 2, Line 5, delete "block site" and insert -- block size --, therefor.

In Column 2, Line 12, delete "Penney" and insert -- Fenney --, therefor.

In Column 2, Line 59, delete "invokes" and insert -- involves --, therefor.

In Column 2, Line 66, delete "in and n" and insert -- m and n --, therefor.

In Column 3, Line 31, delete "systems tbr" and insert -- systems for --, therefor.

In Column 3, Line 52, delete "at embodiment" and insert -- an embodiment --, therefor.

In Column 4, Line 8, delete "according," and insert -- according --, therefor.

In Column 4, Line 20, delete "fir" and insert -- for --, therefor.

In Column 4, Line 30, delete "implementation:" and insert -- implementation; --, therefor.

Signed and Sealed this
Nineteenth Day of April, 2016

Michelle K. Lee
*Director of the United States Patent and Trademark Office*

CERTIFICATE OF CORRECTION (continued)
U.S. Pat. No. 9,087,365 B2

In Column 4, Line 49, delete "invent on;" and insert -- invention; --, therefor.

In Column 4, Line 60, delete "corresponding," and insert -- corresponding --, therefor.

In Column 5, Line 24, delete "during," and insert -- during --, therefor.

In Column 5, Lines 27-28, delete "encoding," and insert -- encoding --, therefor.

In Column 6, Line 9, delete "invention in" and insert -- invention. In --, therefor.

In Column 6, Line 33, delete "Firstly" and insert -- Firstly, --, therefor.

In Column 6, Line 50, delete "art" and insert -- art, --, therefor.

In Column 6, Line 54, delete "YIN" and insert -- YUV --, therefor.

In Column 7, Line 21, delete "or the" and insert -- of the --, therefor.

In Column 7, Line 39, delete "space." and insert -- space, --, therefor.

In Column 7, Line 45, delete "four or mare," and insert -- four or more, --, therefor.

In Column 7, Line 50, delete "on so" and insert -- on --, therefor.

In Column 9, Line 31, delete "tows" and insert -- rows --, therefor.

In Column 9, Line 55, delete "front what" and insert -- from what --, therefor.

In Column 9, Line 61, delete "listed," and insert -- listed --, therefor.

In Column 9, Line 63, delete "thr" and insert -- for --, therefor.

In Column 10, Line 62, delete "illustrated. In" and insert -- illustrated in --, therefor.

In Column 12, Line 13, delete "rust" and insert -- first --, therefor.

In Column 12, Line 15, delete "710." and insert -- 710, --, therefor.

In Column 12, Line 20, delete "ma total" and insert -- in a total --, therefor.

In Column 13, Line 10, delete "assigned," and insert -- assigned --, therefor.

In Column 13, Line 51, delete "calculating," and insert -- calculating --, therefor.

In Column 15, Line 1, delete "selected," and insert -- selected --, therefor.

CERTIFICATE OF CORRECTION (continued)
U.S. Pat. No. 9,087,365 B2

In Column 15, Line 55, delete "based. On" and insert -- based on --, therefor.

In Column 17, Line 50, delete "or" and insert -- (or --, therefor.

In Column 18, Line 21, delete "varying," and insert -- varying --, therefor.

In Column 19, Line 5, delete "FIGS. 12-14B" and insert -- FIGS. 12A-12B --, therefor.

In Column 19, Line 6, delete "THUMB, in" and insert -- THUMB. In --, therefor.

In Column 19, Line 8, delete "space, it" and insert -- space. It --, therefor.

In Column 19, Line 26, delete "having as" and insert -- having a --, therefor.

In Column 19, Line 55, delete "color image" and insert -- color. Image --, therefor.

In Column 19, Line 58, delete "(2>4" and insert -- (2x4 --, therefor.

In Column 19, Line 66, delete "sets. Where" and insert -- sets, where --, therefor.

In Column 20, Line 32, delete "5 hits," and insert -- 5 bits, --, therefor.

In Column 20, Line 38, delete "716; 722," and insert -- 716, 722, --, therefor.

In Column 21, Line 38, delete "first hit" and insert -- first bit --, therefor.

In Column 21, Line 46, delete "than 780" and insert -- diffbit 780 --, therefor.

In Column 21, Line 57, delete "the hits" and insert -- the bits --, therefor.

In Column 22, Line 1, delete "generate" and insert -- generate a --, therefor.

In Column 22, Line 5, delete "for more" and insert -- (or more --, therefor.

In Column 22, Line 13, delete "hits" and insert -- bits --, therefor.

In Column 24, Line 9, delete "or" and insert -- (or --, therefor.

In Column 24, Line 57, delete "$Green: 110_{bin} \leftrightarrow 2 \Rightarrow 214-2=212$" and insert -- $Green: 110_{bin} \leftrightarrow -2 \Rightarrow 214-2=212$ --, therefor.

In Column 25, Line 34, delete "the follow" and insert -- the following --, therefor.

In Column 25, Line 39, delete "the rod" and insert -- the red --, therefor.

CERTIFICATE OF CORRECTION (continued)
U.S. Pat. No. 9,087,365 B2

In Column 25, Line 44, delete "716; 722," and insert -- 716, 722, --, therefor.

In Column 25, Line 55, delete "$Green\ 1:\ 0000_{bin} \Rightarrow 00000000_{bin}0$" and insert -- $Green\ 1:\ 0000_{bin} \Rightarrow 00000000_{bin}=0$ --, therefor.

In Column 26, Line 6, delete "rest:" and insert -- rest --, therefor.

In Column 26, Line 10, delete "ming" and insert -- following --, therefor.

In Column 26, Line 17, delete "triode" and insert -- mode --, therefor.

In Column 26, Line 35, delete "one:" and insert -- one --, therefor.

In Column 26, Line 61, delete "716; 722," and insert -- 716, 722, --, therefor.

In Column 26, Line 62, delete "726; 732," and insert -- 726, 732, --, therefor.

In Column 26, Line 65, delete "$R_0:\ 011001_{bin} \Rightarrow 1100101_{bin}=101$" and insert -- $R_0:\ 011001_{bin} \Rightarrow 01100101_{bin}=101$ --, therefor.

In Column 27, Line 17, delete "(101, 6, 8)." and insert -- (101, 86, 8). --, therefor.

In Column 27, Line 29, delete "processing" and insert -- processing) --, therefor.

In Column 27, Line 43, delete "unit 1110" and insert -- unit 100 --, therefor.

In Column 28, Line 12, delete "according," and insert -- according --, therefor.

In Column 28, Line 22, delete "decoder 200" and insert -- decoder 220 --, therefor.

In Column 28, Line 65, delete "sin" and insert -- size --, therefor.

In Column 28, Line 66, delete "site" and insert -- size --, therefor.

In Column 29, Line 54, delete "thither" and insert -- further --, therefor.

In Column 30, Line 35, delete "index," and insert -- index --, therefor.

In Column 30, Line 51, delete "having," and insert -- having --, therefor.

In Column 30, Line 66, delete "applied," and insert -- applied --, therefor.

CERTIFICATE OF CORRECTION (continued)
U.S. Pat. No. 9,087,365 B2

In Column 31, Line 34, delete "according," and insert -- according --, therefor.

In Column 31, Line 35, delete "as color" and insert -- a color --, therefor.

In the Claims

In Column 33, Line 58, in Claim 6, delete "based on at the" and insert -- based on the at --, therefor.

In Column 33, Line 64, in Claim 6, delete "block; and" and insert -- block; --, therefor.

In Column 34, Line 45, in Claim 12, delete "to a generate" and insert -- to generate --, therefor.

In Column 34, Line 60, in Claim 12, delete "block; and" and insert -- block; --, therefor.